(12) United States Patent
Casagrande

(10) Patent No.: US 8,437,617 B2
(45) Date of Patent: May 7, 2013

(54) METHOD AND APPARATUS FOR MODIFYING THE PRESENTATION OF CONTENT

(75) Inventor: Steven Michael Casagrande, Castle Rock, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 576 days.

(21) Appl. No.: 12/486,641

(22) Filed: Jun. 17, 2009

(65) Prior Publication Data

US 2010/0322592 A1 Dec. 23, 2010

(51) Int. Cl.
*H04N 9/80* (2006.01)

(52) U.S. Cl.
USPC ............ 386/249; 386/239; 386/248; 386/250

(58) Field of Classification Search ..................... None
See application file for complete search history.

(56) References Cited

U.S. PATENT DOCUMENTS

| | | |
|---|---|---|
| 555,566 A | 3/1896 | Bird |
| 3,682,363 A | 8/1972 | Hull |
| 3,919,479 A | 11/1975 | Moon |
| 3,942,190 A | 3/1976 | Detweiler |
| 4,224,481 A | 9/1980 | Russell |
| 4,313,135 A | 1/1982 | Cooper |
| 4,331,974 A | 5/1982 | Cogswell et al. |
| 4,388,659 A | 6/1983 | Lemke |
| 4,404,589 A | 9/1983 | Wright, Jr. |
| 4,408,309 A | 10/1983 | Kiesling et al. |
| 4,439,785 A | 3/1984 | Leonard |
| 4,450,531 A | 5/1984 | Kenyon |
| 4,520,404 A | 5/1985 | Von Kohorn |
| 4,602,297 A | 7/1986 | Reese |
| 4,605,964 A | 8/1986 | Chard |
| 4,633,331 A | 12/1986 | McGrady et al. |
| 4,665,431 A | 5/1987 | Cooper |
| 4,697,209 A | 9/1987 | Kiewit |
| 4,706,121 A | 11/1987 | Young |
| 4,739,398 A | 4/1988 | Thomas |

(Continued)

FOREIGN PATENT DOCUMENTS

| | | |
|---|---|---|
| EP | 521454 | 12/1992 |
| EP | 594241 | 4/1994 |

(Continued)

OTHER PUBLICATIONS

Final Office Action mailed on Apr. 14, 2011 for U.S. Appl. No. 12/130,792, filed May 30, 2008 in the name of Casagrande.

(Continued)

*Primary Examiner* — William C Vaughn, Jr.
*Assistant Examiner* — Eileen Adams
(74) *Attorney, Agent, or Firm* — Ingrassia Fisher & Lorenz, P.C.

(57) ABSTRACT

Described herein are methods and apparatus for the identification of locations in a presentation stream based on metadata associated with the presentation stream. Locations within a presentation stream are identified using location information and/or signature data associated with the presentation stream. The identified locations within a presentation stream may be utilized to identify boundaries of segments within the presentation stream, such as segments of a show. The boundaries of the segments may then be utilized to change the volume of segments or playback a segment at a non-real time presentation rate.

16 Claims, 15 Drawing Sheets

U.S. PATENT DOCUMENTS

| | | |
|---|---|---|
| 4,750,213 A | 6/1988 | Novak |
| 4,755,889 A | 7/1988 | Schwartz |
| 4,760,442 A | 7/1988 | O'Connell et al. |
| 4,761,694 A | 8/1988 | Shudo et al. |
| 4,789,961 A | 12/1988 | Tindall |
| 4,805,217 A | 2/1989 | Morihiro et al. |
| 4,816,905 A | 3/1989 | Tweedy et al. |
| 4,833,710 A | 5/1989 | Hirashima |
| 4,876,670 A | 10/1989 | Nakabayashi |
| 4,888,769 A | 12/1989 | Deal |
| 4,891,715 A | 1/1990 | Levy |
| 4,897,867 A | 1/1990 | Foster et al. |
| 4,916,682 A | 4/1990 | Tomoda et al. |
| 4,918,730 A | 4/1990 | Schulze |
| 4,920,533 A | 4/1990 | Dufresne et al. |
| 4,930,160 A | 5/1990 | Vogel |
| 4,939,594 A | 7/1990 | Moxon et al. |
| 4,947,244 A | 8/1990 | Fenwick et al. |
| 4,949,169 A | 8/1990 | Lumelsky et al. |
| 4,949,187 A | 8/1990 | Cohen |
| 4,963,866 A | 10/1990 | Duncan |
| 4,963,995 A | 10/1990 | Lang |
| 4,972,190 A | 11/1990 | Primeau et al. |
| 4,974,085 A | 11/1990 | Campbell et al. |
| RE33,535 E | 2/1991 | Cooper |
| 4,991,033 A | 2/1991 | Takeshita |
| 5,014,125 A | 5/1991 | Pocock et al. |
| 5,057,932 A | 10/1991 | Lang |
| 5,063,453 A | 11/1991 | Yoshimura et al. |
| 5,093,718 A | 3/1992 | Hoarty et al. |
| 5,121,476 A | 6/1992 | Yee |
| 5,126,852 A | 6/1992 | Nishino et al. |
| 5,126,982 A | 6/1992 | Yifrach |
| 5,130,792 A | 7/1992 | Tindell et al. |
| 5,132,992 A | 7/1992 | Yurt et al. |
| 5,134,499 A | 7/1992 | Sata et al. |
| 5,168,353 A | 12/1992 | Walker |
| 5,191,410 A | 3/1993 | McCalley et al. |
| 5,202,761 A | 4/1993 | Cooper |
| 5,227,876 A | 7/1993 | Cucchi et al. |
| 5,233,423 A | 8/1993 | Jernigan et al. |
| 5,241,428 A | 8/1993 | Goldwasser et al. |
| 5,245,430 A | 9/1993 | Nishimura |
| 5,247,347 A | 9/1993 | Litteral et al. |
| 5,253,275 A | 10/1993 | Yurt et al. |
| 5,311,423 A | 5/1994 | Clark |
| 5,329,320 A | 7/1994 | Yifrach |
| 5,333,091 A | 7/1994 | Iggulden |
| 5,357,276 A | 10/1994 | Banker et al. |
| 5,361,261 A | 11/1994 | Edem et al. |
| 5,371,551 A | 12/1994 | Logan et al. |
| 5,412,416 A | 5/1995 | Nemirofsky |
| 5,414,455 A | 5/1995 | Hooper et al. |
| 5,434,678 A | 7/1995 | Abecassis |
| 5,438,423 A | 8/1995 | Lynch |
| 5,440,334 A | 8/1995 | Walters et al. |
| 5,442,390 A | 8/1995 | Hooper et al. |
| 5,442,455 A | 8/1995 | Hioki et al. |
| 5,452,006 A | 9/1995 | Auld |
| 5,453,790 A | 9/1995 | Vermeulen et al. |
| 5,461,415 A | 10/1995 | Wolf et al. |
| 5,461,428 A | 10/1995 | Yoo |
| 5,477,263 A | 12/1995 | O'Callaghan et al. |
| 5,481,542 A | 1/1996 | Logston et al. |
| 5,508,940 A | 4/1996 | Rossmere et al. |
| 5,513,011 A | 4/1996 | Matsumoto et al. |
| 5,517,250 A | 5/1996 | Hoogenboom et al. |
| 5,521,630 A | 5/1996 | Chen et al. |
| 5,528,282 A | 6/1996 | Voeten et al. |
| 5,533,021 A | 7/1996 | Branstad et al. |
| 5,535,137 A | 7/1996 | Rossmere et al. |
| 5,535,229 A | 7/1996 | Hain, Jr. et al. |
| 5,537,408 A | 7/1996 | Branstad et al. |
| 5,541,919 A | 7/1996 | Young et al. |
| 5,550,594 A | 8/1996 | Cooper et al. |
| 5,555,463 A | 9/1996 | Staron et al. |
| 5,555,555 A | 9/1996 | Sato et al. |
| 5,557,538 A | 9/1996 | Reter et al. |
| 5,557,541 A | 9/1996 | Schulhof et al. |
| 5,559,999 A | 9/1996 | Maturi et al. |
| 5,563,714 A | 10/1996 | Inoue et al. |
| 5,572,261 A | 11/1996 | Cooper |
| 5,574,662 A | 11/1996 | Windrem et al. |
| 5,581,479 A | 12/1996 | McLaughlin et al. |
| 5,583,561 A | 12/1996 | Baker et al. |
| 5,583,652 A | 12/1996 | Ware |
| 5,586,264 A | 12/1996 | Belknap et al. |
| 5,600,364 A | 2/1997 | Hendricks et al. |
| 5,603,058 A | 2/1997 | Belknap et al. |
| 5,604,544 A | 2/1997 | Bertram |
| 5,610,653 A | 3/1997 | Abecassis |
| 5,614,940 A | 3/1997 | Cobbley |
| 5,619,337 A | 4/1997 | Naimpally |
| 5,625,464 A | 4/1997 | Compoint et al. |
| 5,629,732 A | 5/1997 | Moskowitz et al. |
| 5,642,171 A | 6/1997 | Baumgartner et al. |
| 5,648,824 A | 7/1997 | Dunn |
| 5,659,539 A | 8/1997 | Porter et al. |
| 5,664,044 A | 9/1997 | Ware |
| 5,668,948 A | 9/1997 | Belknap et al. |
| 5,675,388 A | 10/1997 | Cooper |
| 5,682,488 A | 10/1997 | Gleason et al. |
| 5,684,918 A | 11/1997 | Abecassis |
| 5,692,093 A | 11/1997 | Iggulden |
| 5,696,866 A | 12/1997 | Iggulden |
| 5,696,868 A | 12/1997 | Kim et al. |
| 5,696,869 A | 12/1997 | Abecassis |
| 5,701,383 A | 12/1997 | Russo et al. |
| 5,703,655 A | 12/1997 | Corey |
| 5,706,388 A | 1/1998 | Isaka |
| 5,712,976 A | 1/1998 | Falcon, Jr. et al. |
| D390,839 S | 2/1998 | Yamamoto et al. |
| 5,715,356 A | 2/1998 | Hirayama et al. |
| 5,719,982 A | 2/1998 | Kawamura et al. |
| 5,721,815 A | 2/1998 | Ottesen et al. |
| 5,721,878 A | 2/1998 | Ottesen et al. |
| D392,269 S | 3/1998 | Mason et al. |
| 5,724,474 A | 3/1998 | Oguro et al. |
| 5,742,730 A | 4/1998 | Couts |
| 5,751,282 A | 5/1998 | Girard et al. |
| 5,751,883 A | 5/1998 | Ottesen et al. |
| 5,761,417 A | 6/1998 | Henley et al. |
| 5,774,170 A | 6/1998 | Hite et al. |
| 5,774,186 A | 6/1998 | Brodsky |
| 5,778,137 A | 7/1998 | Nielsen et al. |
| 5,805,763 A | 9/1998 | Lawler et al. |
| 5,805,821 A | 9/1998 | Saxena et al. |
| 5,808,607 A | 9/1998 | Brady et al. |
| 5,815,689 A | 9/1998 | Shaw et al. |
| 5,822,493 A | 10/1998 | Uehara et al. |
| 5,848,217 A | 12/1998 | Tsukagoshi et al. |
| 5,864,682 A | 1/1999 | Porter et al. |
| 5,870,553 A | 2/1999 | Shaw et al. |
| 5,889,915 A | 3/1999 | Hewton |
| 5,892,536 A | 4/1999 | Logan |
| 5,892,884 A | 4/1999 | Sugiyama et al. |
| 5,899,578 A | 5/1999 | Yanagihara et al. |
| 5,920,572 A | 7/1999 | Washington et al. |
| 5,930,444 A | 7/1999 | Camhi et al. |
| 5,930,493 A | 7/1999 | Ottesen et al. |
| 5,949,954 A | 9/1999 | Young et al. |
| 5,953,485 A | 9/1999 | Abecassis |
| 5,956,716 A | 9/1999 | Kenner et al. |
| 5,973,679 A | 10/1999 | Abbott et al. |
| 5,987,210 A | 11/1999 | Iggulden |
| 5,995,709 A | 11/1999 | Tsuge |
| 5,999,688 A | 12/1999 | Iggulden |
| 5,999,689 A | 12/1999 | Iggulden |
| 5,999,691 A | 12/1999 | Takagi et al. |
| 6,002,443 A | 12/1999 | Iggulden |
| 6,002,832 A | 12/1999 | Yoneda |
| 6,005,562 A | 12/1999 | Shiga et al. |
| 6,005,564 A | 12/1999 | Ahmad et al. |
| 6,005,603 A | 12/1999 | Flavin |
| 6,018,612 A | 1/2000 | Thomason et al. |
| 6,028,599 A | 2/2000 | Yuen et al. |
| 6,055,495 A | 4/2000 | Tucker et al. |

| | | |
|---|---|---|
| D424,543 S | 5/2000 | Hodgson |
| 6,057,893 A | 5/2000 | Kojima et al. |
| D426,208 S | 6/2000 | Hodgson |
| D426,209 S | 6/2000 | Hodgson |
| 6,088,455 A | 7/2000 | Logan |
| 6,091,886 A | 7/2000 | Abecassis |
| RE36,801 E | 8/2000 | Logan et al. |
| 6,100,941 A | 8/2000 | Dimitrova et al. |
| 6,112,226 A | 8/2000 | Weaver et al. |
| 6,138,147 A | 10/2000 | Weaver et al. |
| 6,151,444 A | 11/2000 | Abecassis |
| 6,163,644 A | 12/2000 | Owashi et al. |
| 6,167,083 A | 12/2000 | Sporer et al. |
| 6,169,843 B1 | 1/2001 | Lenihan et al. |
| 6,192,189 B1 | 2/2001 | Fujinami et al. |
| 6,198,877 B1 | 3/2001 | Kawamura et al. |
| 6,208,804 B1 | 3/2001 | Ottesen et al. |
| 6,208,805 B1 | 3/2001 | Abecassis |
| 6,226,447 B1 | 5/2001 | Sasaki et al. |
| 6,232,926 B1 | 5/2001 | Nguyen et al. |
| 6,233,389 B1 | 5/2001 | Barton |
| 6,243,676 B1 | 6/2001 | Whitteman |
| 6,278,837 B1 | 8/2001 | Yasukohchi et al. |
| 6,285,824 B1 | 9/2001 | Yanagihara et al. |
| 6,304,714 B1 | 10/2001 | Krause et al. |
| 6,330,675 B1 | 12/2001 | Wiser et al. |
| 6,335,730 B1 | 1/2002 | Gould |
| 6,341,195 B1 | 1/2002 | Mankovitz et al. |
| D454,574 S | 3/2002 | Wasko et al. |
| 6,400,407 B1 | 6/2002 | Zigmond et al. |
| 6,404,977 B1 | 6/2002 | Iggulden |
| 6,408,128 B1 | 6/2002 | Abecassis |
| 6,424,791 B1 | 7/2002 | Saib |
| 6,425,127 B1 | 7/2002 | Bates et al. |
| 6,445,738 B1 | 9/2002 | Zdepski et al. |
| 6,445,872 B1 | 9/2002 | Sano et al. |
| 6,452,615 B1 | 9/2002 | Chiu et al. |
| 6,490,000 B1 | 12/2002 | Schaefer et al. |
| 6,498,894 B2 | 12/2002 | Ito et al. |
| 6,504,990 B1 | 1/2003 | Abecassis |
| D470,153 S | 2/2003 | Billmaier et al. |
| 6,529,685 B2 | 3/2003 | Ottesen et al. |
| 6,542,695 B1 | 4/2003 | Akiba et al. |
| 6,553,178 B2 | 4/2003 | Abecassis |
| 6,574,594 B2 | 6/2003 | Pitman |
| 6,597,405 B1 | 7/2003 | Iggulden |
| 6,677,967 B2 | 1/2004 | Sawano et al. |
| 6,698,020 B1 | 2/2004 | Zigmond |
| 6,701,355 B1 | 3/2004 | Brandt et al. |
| 6,718,551 B1 | 4/2004 | Swix |
| 6,760,017 B1 | 7/2004 | Banerjee et al. |
| 6,771,316 B1 | 8/2004 | Iggulden |
| 6,788,882 B1 | 9/2004 | Geer et al. |
| D499,740 S | 12/2004 | Ombao et al. |
| 6,850,691 B1 | 2/2005 | Stam |
| 6,856,758 B2 | 2/2005 | Iggulden |
| 6,871,006 B1 | 3/2005 | Oguz et al. |
| 6,931,451 B1 | 8/2005 | Logan |
| 6,978,470 B2 | 12/2005 | Swix |
| 7,032,177 B2 | 4/2006 | Novak |
| 7,032,179 B2 | 4/2006 | Mack et al. |
| D521,521 S | 5/2006 | Jewitt et al. |
| 7,055,166 B1 | 5/2006 | Logan |
| 7,058,376 B2 | 6/2006 | Logan |
| 7,072,849 B1 | 7/2006 | Filepp et al. |
| 7,110,658 B1 | 9/2006 | Iggulden |
| 7,187,884 B2 | 3/2007 | Bardolatzy et al. |
| 7,197,758 B1 | 3/2007 | Blackketter |
| D539,809 S | 4/2007 | Totten et al. |
| 7,243,362 B2 | 7/2007 | Swix |
| 7,251,413 B2 | 7/2007 | Dow |
| 7,266,832 B2 | 9/2007 | Miller |
| 7,269,330 B1 | 9/2007 | Iggulden |
| 7,272,298 B1 | 9/2007 | Lang et al. |
| D554,140 S | 10/2007 | Armendariz |
| D558,220 S | 12/2007 | Maitlen et al. |
| 7,319,761 B2 | 1/2008 | Bianchi et al. |
| 7,320,137 B1 | 1/2008 | Novak |
| 7,376,469 B2 | 5/2008 | Eischeid et al. |
| 7,430,360 B2 | 9/2008 | Abecassis |
| D596,646 S | 7/2009 | Wani |
| D604,308 S | 11/2009 | Takano |
| 7,631,331 B2 | 12/2009 | Sie |
| 7,634,785 B2 | 12/2009 | Smith |
| 7,661,121 B2 | 2/2010 | Smith |
| 7,889,964 B1 | 2/2011 | Barton et al. |
| 2002/0069218 A1 | 6/2002 | Sull et al. |
| 2002/0090198 A1 | 7/2002 | Rosenberg et al. |
| 2002/0092017 A1 | 7/2002 | Klosterman |
| 2002/0092022 A1 | 7/2002 | Dudkicwicz |
| 2002/0097235 A1 | 7/2002 | Rosenberg et al. |
| 2002/0120925 A1 | 8/2002 | Logan |
| 2002/0124249 A1 | 9/2002 | Shintani |
| 2002/0131511 A1 | 9/2002 | Zenoni |
| 2002/0169540 A1 | 11/2002 | Engstrom |
| 2002/0184047 A1 | 12/2002 | Plotnick |
| 2003/0005052 A1 | 1/2003 | Feuer |
| 2003/0031455 A1 | 2/2003 | Sagar |
| 2003/0031458 A1 | 2/2003 | Takahashi |
| 2003/0066078 A1 | 4/2003 | Bjorgan et al. |
| 2003/0084451 A1 | 5/2003 | Pierzga |
| 2003/0093790 A1 | 5/2003 | Logan |
| 2003/0154128 A1 | 8/2003 | Liga |
| 2003/0192060 A1 | 10/2003 | Levy |
| 2003/0194213 A1 | 10/2003 | Schultz et al. |
| 2003/0202773 A1 | 10/2003 | Dow |
| 2003/0231854 A1 | 12/2003 | Derrenberger |
| 2004/0010807 A1 | 1/2004 | Urdang et al. |
| 2004/0040042 A1 | 2/2004 | Feinleib |
| 2004/0049780 A1 | 3/2004 | Gee |
| 2004/0083484 A1 | 4/2004 | Annon Ryal |
| 2004/0172650 A1 | 9/2004 | Hawkins et al. |
| 2004/0177317 A1 | 9/2004 | Bradstreet |
| 2004/0189873 A1 | 9/2004 | Konig |
| 2004/0190853 A1 | 9/2004 | Dow |
| 2004/0244035 A1 | 12/2004 | Wright et al. |
| 2004/0255330 A1 | 12/2004 | Logan |
| 2004/0255334 A1 | 12/2004 | Logan |
| 2004/0255336 A1 | 12/2004 | Logan |
| 2005/0005308 A1 | 1/2005 | Logan |
| 2005/0020223 A1 | 1/2005 | Ellis et al. |
| 2005/0025469 A1 | 2/2005 | Geer et al. |
| 2005/0044561 A1 | 2/2005 | McDonald |
| 2005/0076359 A1 | 4/2005 | Pierson et al. |
| 2005/0081252 A1 | 4/2005 | Chefalas et al. |
| 2005/0132418 A1 | 6/2005 | Barton et al. |
| 2005/0262539 A1 | 11/2005 | Barton |
| 2006/0013555 A1 | 1/2006 | Poslinski |
| 2006/0015925 A1 | 1/2006 | Logan |
| 2006/0059426 A1 | 3/2006 | Ogikubo |
| 2006/0115058 A1 | 6/2006 | Alexander et al. |
| 2006/0143567 A1 | 6/2006 | Chiu et al. |
| 2006/0168630 A1 | 7/2006 | Davies |
| 2006/0218617 A1 | 9/2006 | Bradstreet |
| 2006/0277564 A1 | 12/2006 | Jarman |
| 2006/0277569 A1 | 12/2006 | Smith |
| 2006/0280437 A1 | 12/2006 | Logan |
| 2006/0288374 A1 | 12/2006 | Ferris |
| 2006/0288392 A1 | 12/2006 | Fleming |
| 2007/0030386 A1 | 2/2007 | Cha |
| 2007/0050827 A1 | 3/2007 | Gibbon |
| 2007/0113250 A1 | 5/2007 | Logan |
| 2007/0124758 A1 | 5/2007 | Sung |
| 2007/0136742 A1 | 6/2007 | Sparrell |
| 2007/0156739 A1 | 7/2007 | Black |
| 2007/0168543 A1 | 7/2007 | Krikorian et al. |
| 2007/0171303 A1 | 7/2007 | Barbieri |
| 2007/0199013 A1 | 8/2007 | Samari et al. |
| 2007/0204288 A1 | 8/2007 | Candelore |
| 2007/0212030 A1 | 9/2007 | Koga et al. |
| 2007/0214473 A1 | 9/2007 | Barton |
| 2007/0276926 A1 | 11/2007 | Lajoie |
| 2007/0300249 A1 | 12/2007 | Smith |
| 2007/0300250 A1* | 12/2007 | Smith et al. .................. 725/20 |
| 2007/0300258 A1 | 12/2007 | O'Connor |
| 2008/0013927 A1 | 1/2008 | Kelly et al. |
| 2008/0036917 A1 | 2/2008 | Pascarella |
| 2008/0052739 A1 | 2/2008 | Logan |

| | | | |
|---|---|---|---|
| 2008/0059997 | A1 | 3/2008 | Plotnik et al. |
| 2008/0112690 | A1 | 5/2008 | Shahraray |
| 2008/0155627 | A1 | 6/2008 | O'Connor |
| 2008/0183587 | A1 | 7/2008 | Joo et al. |
| 2008/0267584 | A1* | 10/2008 | Green ............................ 386/95 |
| 2009/0093278 | A1* | 4/2009 | Negron et al. ................ 455/567 |
| 2009/0304358 | A1 | 12/2009 | Rashkovskiy |
| 2010/0138761 | A1* | 6/2010 | Barnes .......................... 715/764 |
| 2011/0194838 | A1 | 8/2011 | Meijer |
| 2011/0197224 | A1 | 8/2011 | Meijer |

FOREIGN PATENT DOCUMENTS

| | | |
|---|---|---|
| EP | 625858 | 11/1994 |
| EP | 645929 | 3/1995 |
| EP | 726574 | 8/1996 |
| EP | 785675 | 7/1997 |
| EP | 817483 | 1/1998 |
| EP | 1536362 | 6/2005 |
| EP | 1705908 | 9/2006 |
| GB | 2222742 | 3/1990 |
| GB | 2320637 | 6/1998 |
| JP | 06-233234 | 8/1994 |
| JP | 06-245157 | 9/1994 |
| JP | 07-111629 | 4/1995 |
| JP | 07-131754 | 5/1995 |
| JP | 07-250305 | 9/1995 |
| JP | 07-264529 | 10/1995 |
| JP | 2001 359079 | 12/2001 |
| JP | 2003153114 | 5/2003 |
| JP | 2006 262057 | 9/2006 |
| JP | 2008 131150 | 6/2008 |
| JP | 2008131150 A | 6/2008 |
| WO | WO 92/22983 | 12/1992 |
| WO | WO 95/09509 | 4/1995 |
| WO | WO 95/32584 | 11/1995 |
| WO | WO 01/22729 | 3/2001 |
| WO | 0223903 A | 3/2002 |
| WO | 2005096625 A1 | 10/2005 |
| WO | 2006003585 A1 | 1/2006 |

OTHER PUBLICATIONS

Final Office Action mailed on Apr. 27, 2011 for U.S. Appl. No. 12/135,360, filed Jun. 9, 2008 in the name of Casagrande.
Invitiation to Pay Fees and Partial Search Report for PCT/EP2011/051335 mailed on May 16, 2011.
Office Action mailed on Jun. 2, 2011 for U.S. Appl. No. 11/942,111, filed Nov. 19, 2007 in the name of Casagrande.
Satterwhite, "Autodetection of TV Commercials," 2004.
Office Action mailed on Jun. 7, 2011 for U.S. Appl. No. 11/942,901, filed Nov. 20, 2007 in the name of Casagrande.
International Search Report for PCT/US2009/069019 mailed on Apr. 14, 2010.
International Search Report for PCT/US2010/038836 mailed on Oct. 1, 2010.
OA mailed on Oct. 27, 2010 for U.S. Appl. No. 12/130,792, filed May 30, 2008 in the name of Casagrande.
Final OA mailed on Nov. 16, 2010 for U.S. Appl. No. 11/942,896, filed Nov. 20, 2007 in the name of Hodge.
OA mailed on Nov. 29, 2010 for U.S. Appl. No. 12/135,360, filed Jun. 9, 2008 in the name of Casagrande.
European Patent Office, "European Search Report" mailed Feb. 24, 2012; International Appln. No. 08169362.4-1241/2061239.
Casagrande "Office Action Response" filed Sep. 2, 2011 for U.S. Appl. No. 11/942,111.
Casagrande "Office Action Response" filed on Sep. 7, 2011 for U.S. Appl. No. 11/942,901.
USPTO "Notice of Allowance" mailed on Sep. 27, 2011 for U.S. Appl. No. 11/942,901 in the name of Casagrande.
USPTO "Notice of Allowance" mailed on Oct. 14, 2011 for U.S. Appl. No. 11/942,111 in the name of Casagrande.
China State Intellectual Property Office "First Office Action" mailed on Oct. 28, 2011 for Chinese Application No. 200980109447.X.
Canadian Intellectual Property Office "Office Action" mailed on Jun. 27, 2011 for Canadian Application 2,665,855.

USPTO "Notice of Allowance" mailed Jan. 27, 2012 for U.S. Appl. No. 11/942,896 in the name of Hodge.
USPTO "Notice of Allowance" mailed Dec. 5, 2011 for U.S. Appl. No. 12/130,792 in the name of Casagrande.
USPTO "Non-Final Office Action" mailed Feb. 7, 2012 for U.S. Appl. No. 12/434,742 in the name of Casagrande.
USPTO "Non-Final Office Action" mailed Feb. 13, 2012 for U.S. Appl. No. 12/434,746 in the name of Casagrande.
USPTO "Non-Final Office Action" mailed Feb. 16, 2012 for U.S. Appl. No. 12/434,751 in the name of Casagrande.
USPTO "Final Office Action" mailed Jan. 31, 2012 for U.S. Appl. No. 12/052,623 in the name of Gratton.
Australian Patent Office "Office Action" mailed on Jun. 9, 2011 for Australian Application No. 2009225834.
Canadian Intellectual Property Office "Office Action" mailed on Aug. 31, 2011 for Canadian Application 2,717,933.
Casagrande "Office Action Response" filed Aug. 15, 2011 for U.S. Appl. No. 12/130,792.
USPTO "Advisory Action" mailed Jul. 1, 2011 for U.S. Appl. No. 12/130,792 in the name of Casagrande.
Casagrande "Office Action Response" filed Aug. 15, 2011 for U.S. Appl. No. 12/135,360.
Casagrande "Office Action Response" filed Jun. 13, 2011 for U.S. Appl. No. 12/130,792.
USPTO "Non-Final Office Action" mailed Oct. 3, 2011 for U.S. Appl. No. 11/942,896 in the name of Hodge.
USPTO "Final Office Action" mailed Aug. 1, 2012 for U.S. Appl. No. 12/434,751, filed May 4, 2009.
Canadian Intelelctual Property Office "Office Action" mailed Feb. 27, 2012; Canadian Patent Appln. No. 2,665,850.
Australian Government "Patent Examination Report No. 2" issued Jul. 12, 2012; Australian Patent Appln. No. 2009225834.
USPTO "Final Office Action" mailed Jul. 19, 2012; U.S. Appl. No. 121434,742, filed May 4, 2009.
Pogue, David "Networks Start to Offer TV on the Web" The New York Times, Oct. 18, 2007; retrieved from the internet at http://www.nytimes.com/007/10/18/technology/circuits/18pogue.html?pagewanted=print on Aug. 1, 2012.
TiVo "TiVo Launches Remote Scheduling With Verizon Wireless," Mar. 14, 2007.
Associated Press "AT&T Lets Mobile Phones Control Your Television," Mar. 6, 2007.
Japan Patent Office "Notice of Rejection Ground" mailed Sep. 4, 2012 for Japanese Patent Appln. No. 2011-500879.
Canadian Patent Office "Office Action" mailed Jul. 23, 2012 for Canadian Patent Appln. No. 2,717,933.
USPTO "Non-Final Office Action" mailed Sep. 6, 2012 for U.S. Appl. No. 12/135,360, filed Jun. 9, 2008.
USPTO "Non-Final Office Action" mailed Sep. 25, 2012 for U.S. Appl. No. 12/052,623, filed Mar. 20, 2008.
USPTO "Final Office Action" mailed Oct. 17, 2012 for U.S. Appl. No. 12/703,049, filed Feb. 9, 2010.
China State Intellectual Property Office "Office Action" mailed Sep. 24, 2012 for China Appln. No. 200980109447.X.
Dimitrova, N., et al, "Real Time Commercial Detection Using MPEG Features", Philips Research, (Aug. 25, 2002).
"Paramount Pictures Corp. v. ReplayTV & SonicBlue", http://www.eff.org/IP/Video/Paramount v. ReplayTV/20011031_complaint.html, Complaint Filed, (Oct. 30, 2001).
Manjoo, Farhad, "The Know What You're Watching", Wired News, http://www.wired.com/news/politics/0.1283.52302.00.html, (May 2, 2002).
Haughey, Matt, "EFF's ReplayTV Suit Ends", http://www.pvrblog.com/pvr/2004/01/effs_replaytv_s.html, (Jan. 12, 2004).
Mizutani, Masami, et al, "Commercial Detection in Heterogeneous Video Streams Using Fused Multi-Modal and Temporal Features", IEEE ICASSP, 2005, Philadelphia, (Mar. 22, 2005).
Tew, Chris, "How MythTV Detects Commercials", http://www.pvrwire.com/2006/10/27/how-mythtv-detects-commercials/, (Oct. 27, 2006).
RCA, "RCA DRC8060N DVD Recorder", http://www.pricegrabber.com/rating_getprodrev.php/product_id=124762074/id, PriceGrabber.com, (Jan. 26, 2007).

"How to Write a New Method of Commercial Detection", MythTV, http://www.myth.tv.org/wiki/index.php/How to Write a New Method of Commercial Detection, (Jan. 26, 2007).

"Comskip", http://www.kaashoek.com/comskip/, commercial detector, (Jan. 26, 2007).

Casagrande, Steven; U.S. Appl. No. 11/942,111, filed Nov. 19, 2007.

Hodge, Kenneth; U.S. Appl. No. 11/942,896, filed Nov. 20, 2007.

Casagrande, Steven; U.S. Appl. No. 11/942,901, filed Nov. 20, 2007.

OA mailed on May 24, 2010 for U.S. Appl. No. 11/942,896, filed Nov. 20, 2007 in the name of Hodge.

Gratton, Max; U.S. Appl. No. 12/052,623, filed Mar. 20, 2008.

Casagrande, Steven; U.S. Appl. No. 12/130,792, filed May 30, 2008.

Casagrande, Steven; U.S. Appl. No. 12/135,360, filed Jun. 9, 2008.

Casagrande, Steven; U.S. Appl. No. 12/434,742, filed May 4, 2009.

Casagrande, Steven; U.S. Appl. No. 12/434,746, filed May 4, 2009.

Casagrande, Steven; U.S. Appl. No. 12/434,751, filed May 4, 2009.

ISR for PCT/US2009/037183 mailed on Jul. 15, 2009.

* cited by examiner

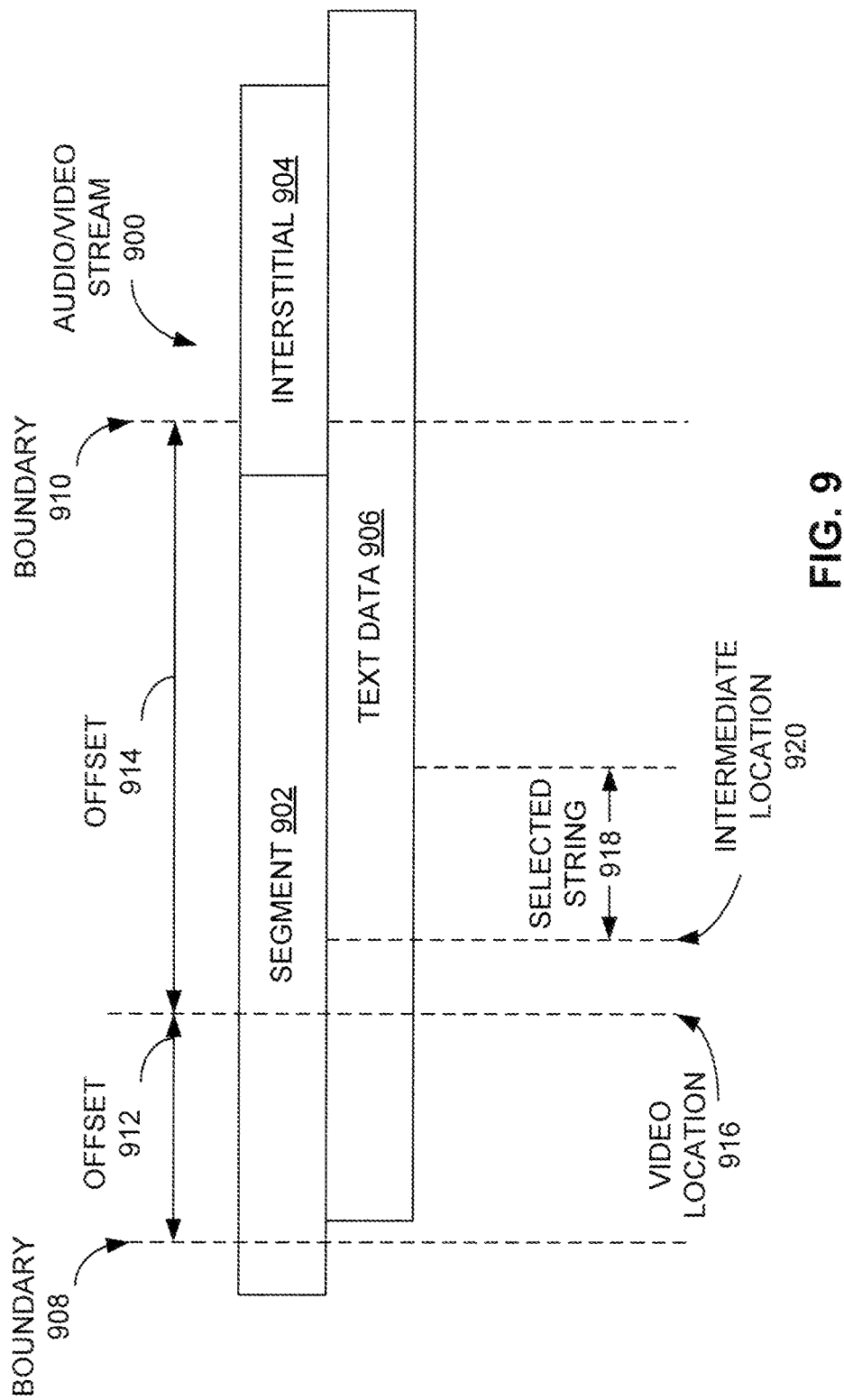

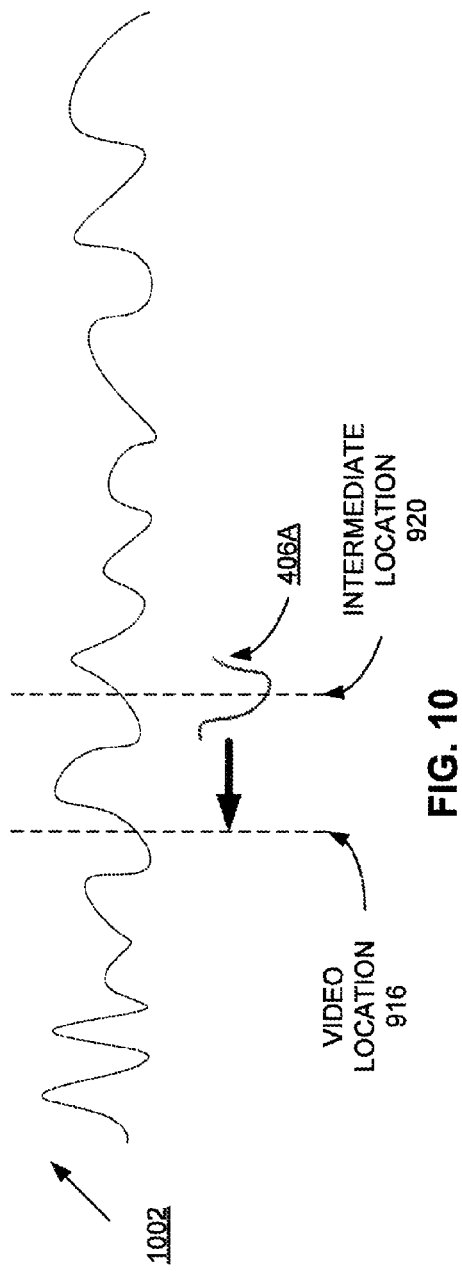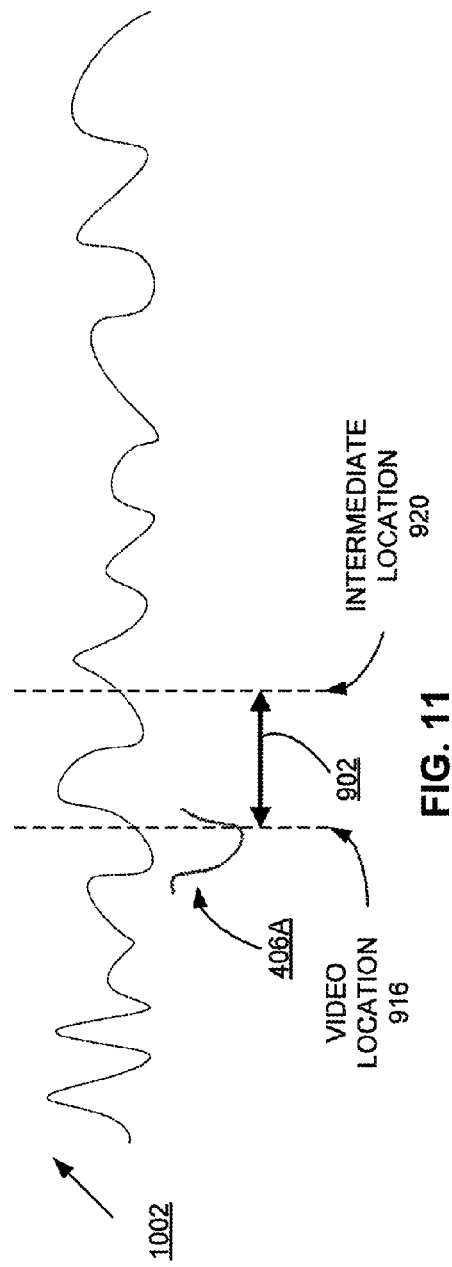

METHOD AND APPARATUS FOR MODIFYING THE PRESENTATION OF CONTENT

BACKGROUND

Digital video recorders (DVRs) and personal video recorders (PVRs) allow viewers to record video in a digital format to a disk drive or other type of storage medium for later playback. DVRs are often incorporated into set-top boxes for satellite and cable television services. A television program stored on a set-top box allows a viewer to perform time shifting functions, and may additionally allow a viewer to skip over commercial breaks and other portions of the recording that the viewer does not desire to watch. However, the user performs this function manually, for example, using a fast forward button of a remote control associated with the DVR. This manual fast forwarding is an inconvenience for the user. Further, manual fast forwarding by a user often leads to inaccurate results, because the user may fast forward past portions of the recording they desire to watch, or may resume playback during the portion of the recording that they want to skip over.

BRIEF DESCRIPTION OF THE DRAWINGS

The same number represents the same element or same type of element in all drawings.

FIG. 9 illustrates an embodiment in which intermediate boundaries of a segment of an A/V stream are identified based on a text string included with the text data associated with the A/V stream.

FIGS. 10-11 illustrate embodiments of graphical representations of a subtraction process performed to determine an offset between the video location and the intermediate location.

DETAILED DESCRIPTION OF THE DRAWINGS

Figure 1:
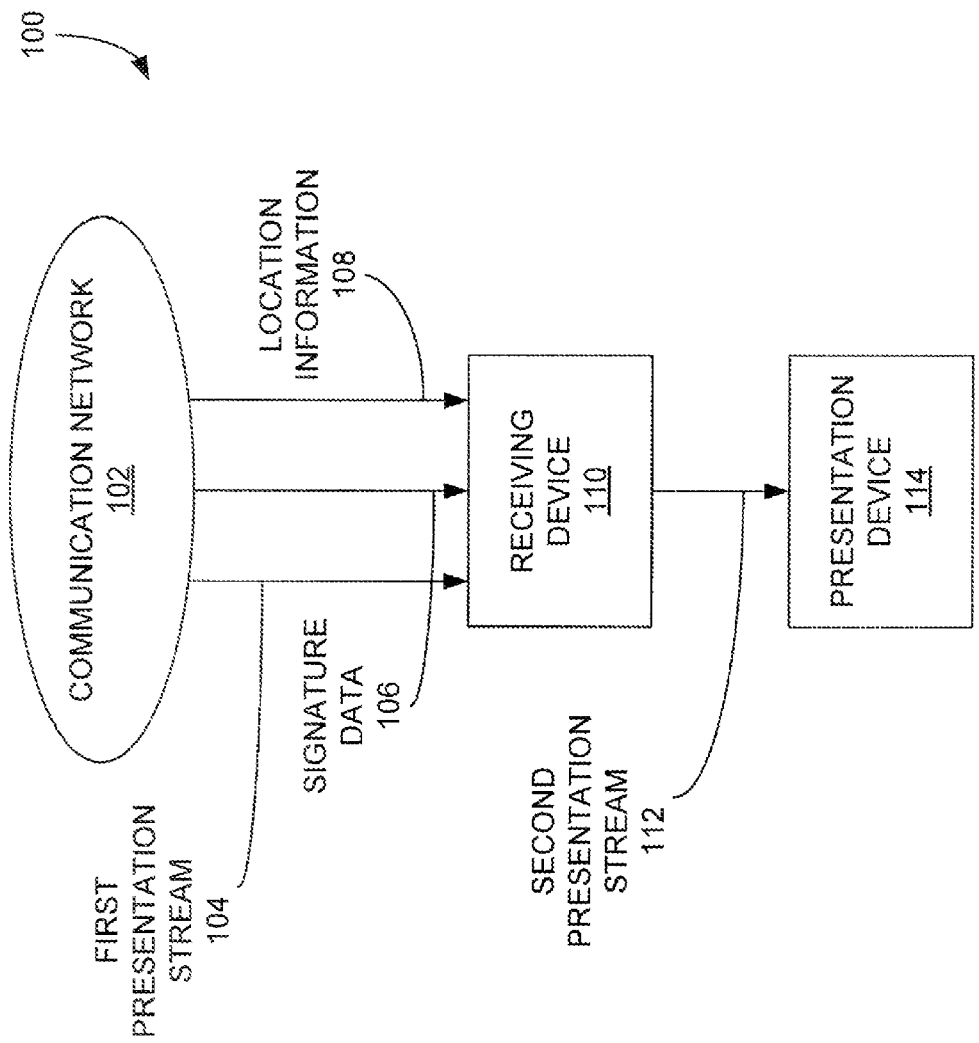
FIG. 1 illustrates an embodiment of a system for presenting content to a user.

The various embodiments described herein generally provide apparatus, systems and methods which facilitate the reception, processing, and outputting of presentation content. More particularly, the various embodiments described herein provide for the identification of locations in a presentation stream based on metadata associated with the presentation stream. Identified locations within a presentation stream may be utilized to identify boundaries of segments within the presentation stream, such as segments of a show and interstitials (e.g., commercials) of the show. In various embodiments, identified portions of a presentation stream may be utilized for presentation of particular segments of content at a non-real time presentation rate (e.g., fast forwarding or slow motion presentation). In some embodiments, the volume of audio data associated with particular segments may be changed during playback (e.g., raised, lowered or muted).

In at least one embodiment, the presentation stream to be received, processed, outputted and/or communicated may come in any form of presentation data, such as audio data, video data, A/V data, slide shows and the like. Further, the presentation stream may be supplied by any source.

In at least one embodiment, a receiving device receives location information referencing a location within the first presentation stream. For example, the location information may be received separately from the first presentation stream. Additionally received is a signature of a portion of a presentation stream corresponding with the location. As used herein, a signature refers to characteristics of a waveform or data that help identify an event or condition. The location information and/or the signature data may be supplied separately from the presentation stream. Further, the location information and/or the signature data may be supplied by the same source as the presentation stream or a different source as the presentation stream depending on desired design criteria.

The receiving device processes the presentation stream to locate the signature portion, and thus, the location referenced by the location information. In at least one embodiment, the receiving device identifies portions of the presentation stream based on the identified location, such as boundaries of segments of content. The receiving device may then perform further processing using the identified portions of the presentation stream, such as changing the presentation rate of the segments or changing the volume of the segments.

In some embodiments, the boundaries of segments of the presentation stream may correspond with the location of the signature data. In other words, the signature data comprises a portion of the presentation stream at the boundary of the segment. In at least one embodiment, the boundaries of segments are specified relative to the location of the signature data. For example, a location of signature data may be the middle of a segment of the presentation stream and the boundaries of the segment may be specified by beginning and ending off-sets specified relative to the location of the signature data.

In at least one embodiment, identified segments may be designated for playback at varying presentation rates. For example, some segments may be played back at a real time presentation rate (e.g., 1×), whereas other segments may be played back at a non-real time presentation rate (e.g., 2× or 5×). The non-real time presentation rate may be faster or slower than the real time presentation rate depending on desired design criteria. For example, some segments may be presented in slow motion, allowing the user more time to experience the content in the segment. In other scenarios, segments may be presented in a fast forward mode (e.g., 5× rate). For example, the commercials within a program may be automatically fast forwarded through by the playback device. Thus, a user still sees the commercials and the advertiser still receives some benefit from the advertising spot, but the user saves time by watching the commercial in less time.

In some embodiments, the audio data of particular segments may be changed depending on desired design criteria. This may include raising the volume of the audio data, lowering the volume of the audio data and muting the audio data. For example, the volume of commercials is often louder than the volume of the audio data for the corresponding program content. Thus, it may be desirable to lower the volume of the audio data for commercials or even mute the audio data of the commercials. In at least one embodiment, the audio data of particular portions of an audio/video stream may be relatively quieter than other portions of content and it may be desirable to raise the volume of the quieter portions of the program. Thus, the playback device may automatically raise the volume of these segments, eliminating the need for the user to manually adjust the volume up and down throughout a program.

As described above, a presentation stream may come in any form of an A/V stream. Exemplary A/V stream formats include Motion Picture Experts Group (MPEG) standards, Flash, Windows Media and the like. It is to be appreciated that the A/V stream may be supplied by any source, such as an over-the-air broadcast, a satellite or cable television distribution system, a digital video disk (DVD) or other optical disk, the internet or other communication networks and the like.

Generally, an A/V stream is a contiguous block of associated audio and video data that may be transmitted to, and received by, an electronic device, such as a terrestrial ("over-the-air") television receiver, a cable television receiver, a satellite television receiver, an internet connected television or television receiver, a computer, a portable electronic device, or the like. In at least one embodiment, an A/V stream may include a recording of a contiguous block of programming from a television channel (e.g., an episode of a television show). For example, a DVR may record a single channel between 7:00 and 8:00, which may correspond with a single episode of a television program. Generally, an hour long recording includes approximately 42 minutes of video frames of the television program and approximately 18 minutes of video frames of commercials and other content that is not part of the television program.

The television program may be comprised of multiple segments of video frames, which are interspersed with interstitials (e.g., commercials). As used herein, interstitials are the video frames of a recording that do not belong to a selected show (e.g., commercials, promotions, alerts, and other shows). A segment of video includes contiguous video frames of the program that are between one or more interstitials.

Further, an A/V stream may be delivered by any transmission method, such as broadcast, multicast, simulcast, closed circuit, pay-per-view, point-to-point (by "streaming," file transfer, or other means), or other methods. Additionally, the A/V stream may be transmitted by way of any communication technology, such as by satellite, wire or optical cable, wireless or other means. The A/V stream may also be transferred over any type of communication network, such as the internet or other wide area network (WAN), a local area network (LAN), a private network, a mobile communication system, a terrestrial television network, a cable television network and a satellite television network. In some embodiments, content may be accessed from storage devices, such as hard drives, optical disks, portable storage mediums, e.g., USB flash drives and the like.

In some embodiments, the A/V data may be associated with supplemental data that includes text data, such as closed captioning data or subtitles. Particular portions of the closed captioning data may be associated with specified portions of the A/V data. The text data associated with an A/V stream may be processed to identify portions of the A/V stream. More particularly, the text data may be processed to identify boundaries of portions of the A/V stream. The portions of the A/V stream between identified boundaries may then be designated for presentation to a user at varying presentation rates or may be designated for presentation at varying audio levels.

In at least one embodiment, the above described signature identification technique may be enhanced in combination with the aforementioned text processing technique. In other words, a receiving device may process location information that references closed captioning data associated with a video location and a signature of data corresponding with the video location to identify the video location in the presentation stream. In at least one embodiment, closed captioning data is utilized to narrow a portion of the A/V stream that is searched to identify a location corresponding with the signature data.

For example, closed captioning data may be searched to identify the vicinity of the video location in the presentation stream. In other words, the closed captioning data is searched to identify search boundaries that include the video location. The search boundaries of the presentation stream are then processed to identify the video location based on the signature data. This is useful for example when a broadcaster shifts closed captioning data by several seconds from the original presentation location of the corresponding audio data. Because the location of particular frames of video data within a segment do not typically change, the location of the signature data in the presentation stream provides a more reliable absolute location, but also utilizes relatively more computational resources. The closed captioning data search may be utilized to narrow the amount of data to be processed to identify the signature data.

FIG. 1 illustrates an embodiment of a system 100 for presenting content to a user. The system of FIG. 1 is operable for identifying locations within a contiguous block of presentation data. Additionally, the system of FIG. 1 is operable for identifying locations in a presentation stream, such as boundaries of segments of the presentation stream. For example, segments of presentation content may be identified and presented at varying presentation rates. In other embodiments, identified segments and locations may also be utilized for varying the audio levels of the segments (e.g., raising or lowering the volume of the audio data).

FIG. 1 will be described initially in reference to the presentation of segments of presentation content at varying presentation rates and the other applications of the identification process will be described in further detail below. The system 100 includes a communication network 102, a receiving device 110 and a presentation device 114. Each of these components is discussed in greater detail below. FIG. 1 may include other devices, components or elements not illustrated for the sake of brevity.

The communication network 102 may be any communication network capable of transmitting a presentation stream. Exemplary communication networks include television distribution networks (e.g., over-the-air (OTA), satellite and cable television networks), radio broadcast networks, wireless communication networks, public switched telephone networks (PSTN), LANs and WANs providing data communication services. The communication network 102 may utilize any desired combination of wired (e.g., cable and fiber) and/or wireless (e.g., cellular, satellite, microwave and radio frequency) communication mediums and any desired network topology (or topologies when multiple mediums are utilized).

The receiving device 110 of FIG. 1 may be any device capable of receiving a presentation stream from the communication network 102. In at least one embodiment, the communication network 102 comprises a cable or satellite television network for distribution of an A/V stream and the receiving device 110 comprises a set-top box configured to communicate with the communication network 102. In at least one embodiment, the receiving device 110 comprises a DVR. In another example, the receiving device 110 may be computer, a personal digital assistant (PDA) or similar device configured to communicate with the internet or comparable communication network 102 to receive and present A/V content. In at least one embodiment, the receiving device 110 comprises a radio that receives audio content, via broadcast, multicast or uni-cast, from the communication network 102. While the receiving device 110 is illustrated as receiving content via the communication network 102, in other embodiments, the receiving device may receive, capture, record, access and/or process presentation streams from non-broadcast services, such as optical disks, local storage devices (e.g., hard drives or flash memory), video recorders, DVD players, personal computers or the internet.

The presentation device 114 may be any device configured to receive a presentation stream from the receiving device 110 and present the presentation stream to a user. Examples of the presentation device 114 include a television, a video monitor or similar device capable of presenting audio and/or video information to a user, a stereo or audio receiver, a projector and the like. The receiving device 110 may be communicatively coupled to the presentation device 114 through any type of wired or wireless connection. Exemplary wired connections include coax, fiber, composite video and high-definition multimedia interface (HDMI). Exemplary wireless connections include WiFi, ultra-wide band (UWB) and Bluetooth. In some implementations, the presentation device 114 may be integrated within the receiving device 110. For example, each of a computer, a television, a stereo with an integrated radio receiver, a PDA and a mobile communication device may serve as both the receiving device 110 and the presentation device 114 by providing the capability of receiving presentation streams from the communication network 102 and presenting the received presentation streams to a user.

In the system 100, the communication network 102 transmits each of a first presentation stream 104, signature data 106 and location information 108 to the receiving device 110. In at least one embodiment, the first presentation stream 104 comprises video data, such as a series of digital frames or single images to be presented in a serial fashion to a user. In another embodiment, the first presentation stream 104 comprises audio data, such as a series of audio samples to be presented to the user. In some embodiments, the first presentation stream 104 comprises A/V data, including a combination of the aforementioned audio data and video data that are presented simultaneously to the user. In one example, the A/V data may be formatted according to one of the MPEG encoding standards, such as MPEG-2 or MPEG-4, as may be used in DBS systems, terrestrial Advanced Television Systems Committee (ATSC) systems or cable systems. However, different audio and video data formats may be utilized in other implementations.

The communication network 102 also transmits signature data 106 and location information 108 to the receiving device 110. The signature data 106 and/or the location information 108 may be transmitted to the receiving device 110 together or separately. Further, the signature data 106 and/or the location information 108 may be transmitted to the receiving device 110 together or separately from the first presentation stream 104. Generally, the signature data 106 includes a sample of data included within the first presentation stream 104 that is utilized to identify a location within the first presentation stream 104. The location within the first presentation stream 104 is identified by searching for the signature data 106 in the first presentation stream 104.

The location information 108 specifies information regarding the location associated with the signature data 106. In at least one embodiment, the location information 108 specifies portions of the first presentation stream 104 that are to be presented at non-real time presentations rates (e.g., faster or slower than 1×rate) by the receiving device 110. For example, if the first presentation stream 104 includes one or more segments of a television show interspersed with one or more interstitials, then the location information 108 may identify the locations of the segments, which are to be fast-forwarded through during presentation or shown in slow motion.

Boundaries of segments in the first presentation stream 104 may either correspond with locations specified by the signature data 106 or may be identified by off-sets specified relative to a location corresponding with the signature data 106. For example, a location specified by the signature data 106 may be the middle of a particular segment of presentation content and beginning and ending off-sets may specify the boundaries of the associated segment of the first presentation stream 104. In at least one embodiment, the identification process is utilized to identify interstitials within a first presentation stream 104 that are to be presented at different presentation rates. The location information 108 may identify the boundaries of either the segments or the interstitials depending on desired design criteria. Generally, the beginning boundary of a segment corresponds with the ending boundary of an interstitial. Similarly, the ending boundary of a segment corresponds with the beginning boundary of an interstitial. Thus, the receiving device 110 may utilize the boundaries of segments to identify the boundaries of the interstitials, and vice versa. In some embodiments, the first presentation stream 104 may not include both segments and interstitials, but nonetheless may include portions of content that a user desires to playback at non-real time rates. Thus, the location information 108 may identify which portions of the content of the first presentation stream 104 are to be presented at which presentation rates.

Figure 2:
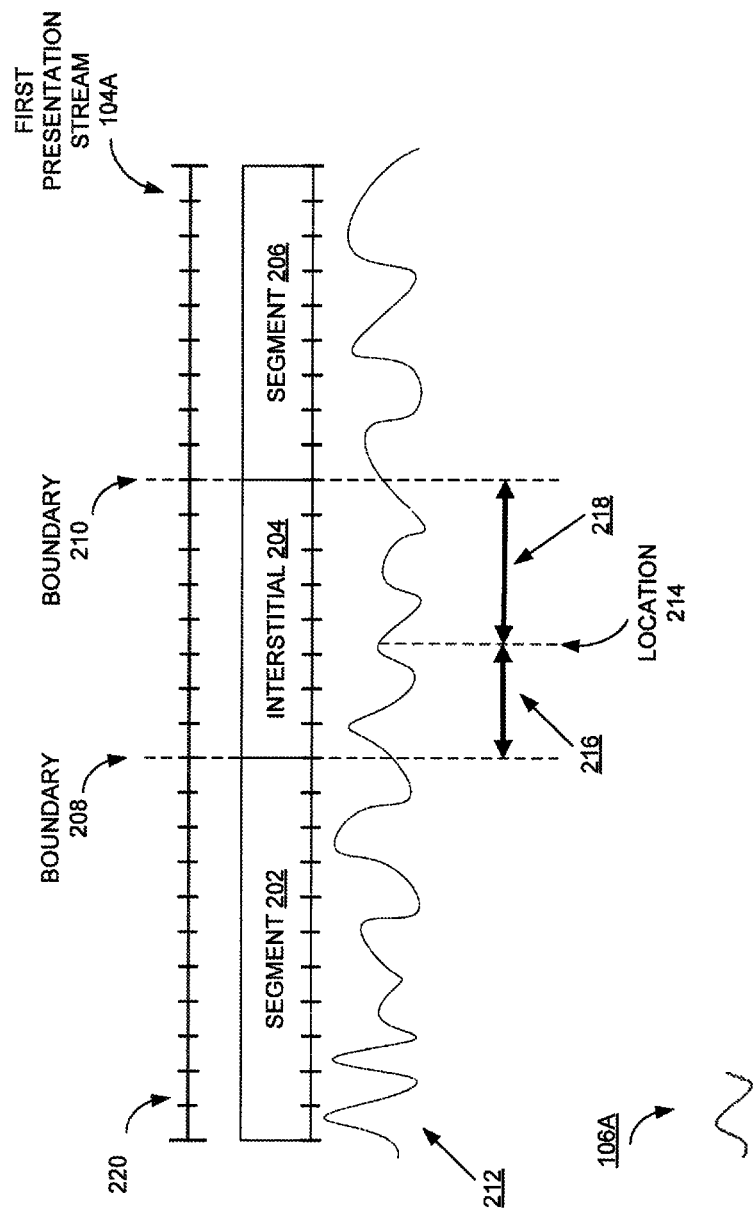
FIG. 2 illustrates an embodiment of a graphical representation of a first presentation stream received by the receiving device.

In at least one embodiment, the signature data 106 comprises a portion of audio data of the first presentation stream 104. For example, the first presentation stream 104 may comprise either an audio file (e.g., an MP3 audio file) or an A/V stream including audio data. The signature data 106 may then comprise a sample of a portion of the audio data. FIG. 2 illustrates an embodiment of a graphical representation of a first presentation stream received by the receiving device 110. FIG. 2 will be discussed in reference to the system 100 of FIG. 1.

The first presentation stream 104A includes a first segment 202 of content, an interstitial 204 and a second segment 206 of content. Also indicated are beginning and ending boundaries 208 and 210 of the interstitial 204, which are indicated to the receiving device 110 (see FIG. 1) by way of the location information 108. It is to be recognized that the boundaries 208 and 210 of the interstitial 204 are also boundaries of the segments 202 and 206. Also illustrated in FIG. 2 is a waveform 212 of the audio data corresponding with the first presentation stream 104A and a time bar 220 that illustrates the presentation time of portions of the first presentation stream 104A.

The signature data 106A illustrated in FIG. 2 corresponds with a portion of the waveform 212. The receiving device 110 processes the waveform 212 to identify the location 214 corresponding with the signature data 106A. In at least one embodiment, the location 214 may be identified by processing samples of the output signal for the audio data. In at least one embodiment, the location 214 may be identified based on an output power of the audio data of the first presentation stream 104A. For example, samples of specific durations of audio data may be computed to identify the location 214 corresponding with the signature data 106A.

In the illustrated example, the location 214 corresponding with the signature data 106A is in the middle of the interstitial 204. Thus, the receiving device 110 may utilize offsets 216 and 218 to identify the boundaries of the interstitial 204 (as well as the boundaries of the segments 202 and 206). In some embodiments, the signature data 106A and the location 214 may correspond with one of the boundaries 208 or 210 such that the offsets 216 and 218 are not utilized.

Figure 3:
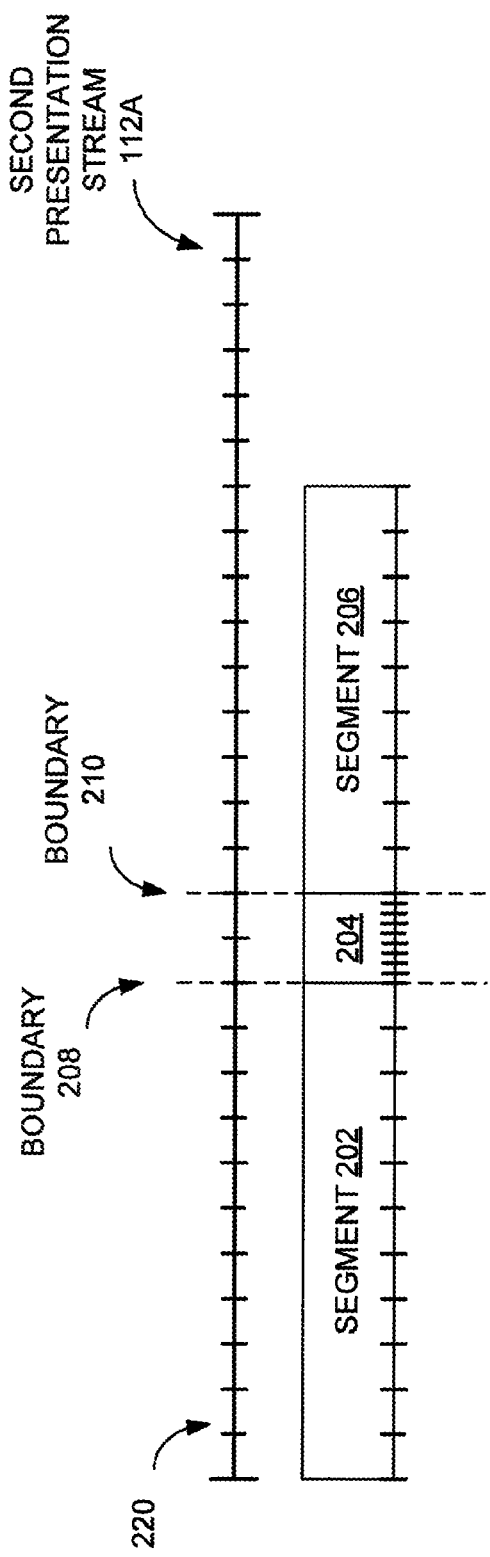
FIG. 3 illustrates an embodiment of a second presentation stream outputted by the receiving device of FIG. 1.

Responsive to identifying the boundaries, the receiving device 110 may present the interstitial 204 at a non-real time presentation rate during output of the content. For example, the presentation devices may output the interstitial 204 at a 4× presentation rate, while presenting the segments 202 and 206 at 1× presentation rate. FIG. 3 illustrates an embodiment of a second presentation stream outputted by the receiving device 110 of FIG. 1. As illustrated in FIG. 3, the receiving device 110 presents the interstitial 204 in the second presentation stream 112A at a faster presentation rate than the first presentation stream 104A. Thus, the second presentation stream 112A is presented in a shorter duration than the first presentation stream 104A.

In at least one embodiment, the signature data 106 comprises compressed data, e.g., compressed audio or video data. The compressed data may then be expanded and compared with the audio or video data of the first presentation stream 104 which has also been uncompressed. In some embodiments, the signature data 106 may be compared with the data of the first presentation stream 104 in compressed format, e.g., before either data has been expanded.

Referring back to FIG. 1, the receiving device 110 may also identify locations within a first presentation stream 104 based on analyzation of video data. In at least one embodiment, the receiving device processes luminance values of video data to identify locations within a first presentation stream 104. For example, the receiving device 110 may compute the average luminance value for each frame of video data for the first presentation stream 104. The average luminance value may be computed for an entire frame or some subset thereof.

After computing the average luminance values for frames, the receiving device 110 processes the average luminance values for the plurality of frames to locate a particular frame having an average luminance value as specified by the signature data 106. An identified frame corresponds with an identified location as specified by the location data. Boundaries of segments of the first presentation stream 104A may then be determined based on the location and/or other data, such as offset values. For example, offset values may identify boundaries of segments corresponding with an identified video location.

In some embodiments, the processing of the video data performed by the receiving device 110 may identify frames having an average luminance value within a specified tolerance of a value specified by the signature data 106. This allows the system 100 to account for situations where the video data received by each receiving device 110 is not the same. For example, video data may be damaged during transmission, local affiliates may insert different channel logos onto a television program and television programs may include weather alerts or other scrolling information.

In at least one embodiment, the receiving device 110 may identify locations in a presentation stream based on average luminance value transitions rather than identifying absolute average luminance values. For example, the signature data 106 may specify a transition from a first luminance value to a second luminance value within the presentation stream. The transition may be specified in absolute or relative terms. The receiving device 110 computes the average luminance values for the frames of the first presentation stream 104 and then processes the average luminance values to identify a location within the first presentation stream 104A. Table #1 illustrates an embodiment of average luminance values for a plurality of frames of the first presentation stream 104.

TABLE #1

| Average luminance values | |
| --- | --- |
| Frame | Luminance value |
| 1 | 55% |
| 2 | 53% |
| 3 | 50% |
| 4 | 51% |
| 5 | 98% |
| 6 | 76% |
| 7 | 75% |
| 8 | 78% |

Take for example the situation where the signature data 106 specifies an average luminance value transition from 50% to 100% and a tolerance of ±5%. The receiving device processes the data in Table #1 to identify the transition from frame 4 to frame 5 as matching the criteria of the signature data 106. As such, the receiving device 110 identifies frame #5 as the video location specified by the location information 108. The receiving device 110 may then identify boundaries of segments using off-sets in accordance with the teachings above to playback portions of content during output of the second presentation stream 112 at varying presentation rates and/or audio levels.

Depending on the resiliency and other characteristics of the first presentation stream, the node of the communication network 102 generating and transmitting the location information 108 and the signature data 106 may issue more than one instance of the location information 108 and the signature data 106 to the receiving device 110. Each transmitted set of signature data 106 may be associated with a particular set of location information 108. Further, each set of signature data 106 may point to a particular location within the first presentation stream 104. Each set of location information 108 may include different off-set values specified relative to the associated signature data 106. Thus, the receiving device 110 may locate the boundaries of a particular segment of the first presentation stream 104 based on identifying multiple locations within the first presentation stream 104. Each set of location information 108 and signature data 106 may be issued separately, or may be transmitted in one more other sets.

In accordance with another embodiment, locations and segments of a presentation stream may be identified by processing supplement content, such as text data, associated with the presentation stream. For example, closed captioning data associated with an A/V stream may be processed to identify locations within the A/V stream.

Figure 4:
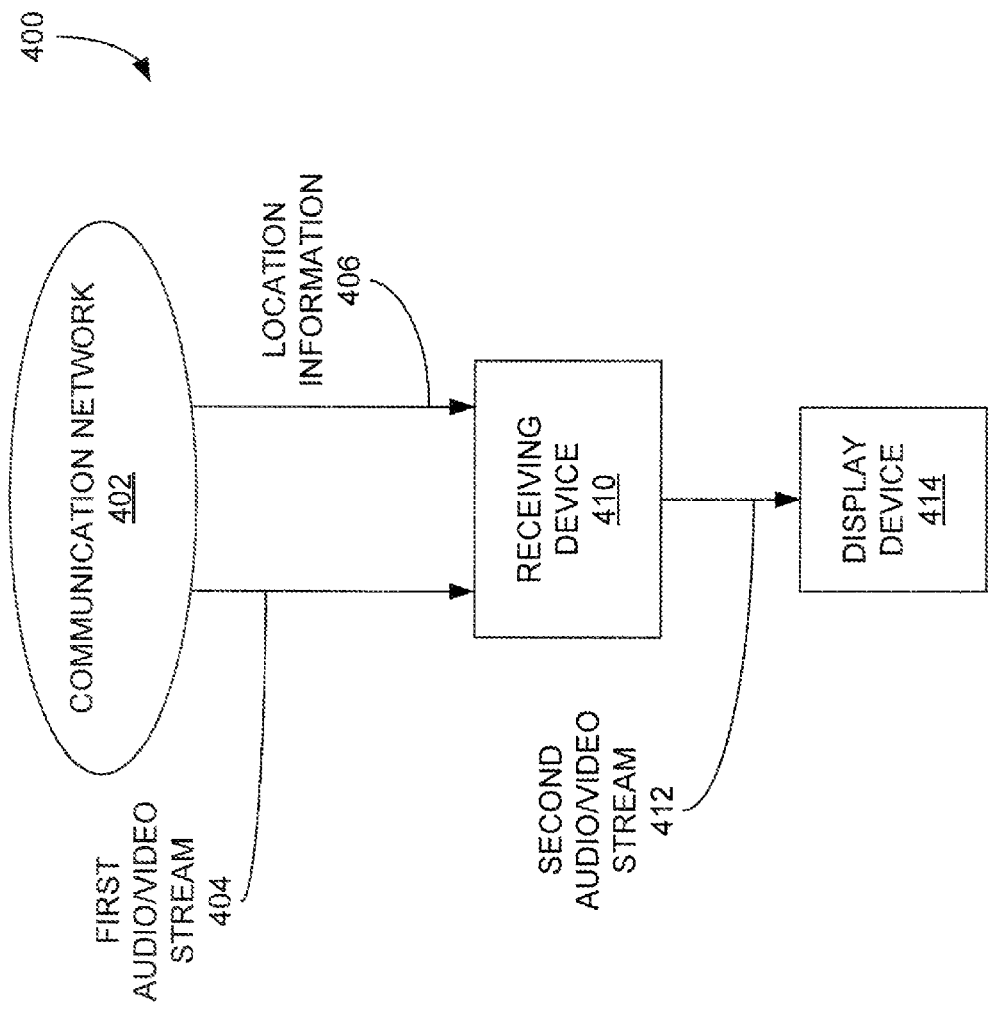
FIG. 4 illustrates an embodiment of a system for presenting content to a user.

FIG. 4 illustrates an embodiment of a system 400 for presenting content to a user. The system of FIG. 4 is operable for identifying A/V content in a contiguous block of A/V data. The system 400 includes a communication network 402, a receiving device 410 and a display device 414. Each of these components is discussed in greater detail below. The system 400 of FIG. 4 may include other devices, components or elements not illustrated for the sake of brevity.

The communication network 402 may be any communication network capable of transmitting an A/V stream to a receiving device 110. The communication network 402 may be similar to the communication network 102 of FIG. 1. The receiving device 410 of FIG. 4 may be any device capable of receiving an A/V stream from the communication network 402 and outputting the A/V stream for presentation by a display device 414. The receiving device 410 may be similar to the receiving device 110, with additional hardware, software or control logic provided to identify locations within an A/V stream as described below. The display device 414 may be any device configured to receive an A/V stream from the receiving device 410 and present the A/V stream to a user. The display device 414 may be similar to the presentation device 114 described above. Further discussion of the communication network 402, the receiving device 410 and the display device 414 is omitted herein for the sake of brevity.

In the system 400, the communication network 402 transmits a first A/V stream 404 and location information 406 to the receiving device 410. Also associated with the first A/V stream 404 is supplemental data providing information relevant to the audio data and/or the video data of the first A/V stream 404. In one implementation, the supplemental data includes text data, such as closed captioning data, available for visual presentation to a user during the presentation of the associated audio and video data of the first A/V stream 404. In some embodiments, the text data may be embedded within the first A/V stream 404 during transmission across the communication network 402 to the receiving device 410. In one example, the text data may conform to any text data or closed captioning standard, such as the Electronic Industries Alliance 608 (EIA-608) standard employed in transmissions or the EIA-708 standard. When the text data is available to the display device 414, the user may configure the display device 414 to present the text data to the user in conjunction with the video data.

Each of a number of portions of the text data may be associated with a corresponding portion of the audio data or video data also included in the A/V stream 404. For example, one or more frames of the video data of the A/V stream 404 may be specifically identified with a segment of the text data included in the first A/V stream 404. A segment of text data (e.g., a string of bytes) may include displayable text strings as well as non-displayable data strings (e.g., codes utilized for positioning the text data). As a result, multiple temporal locations within the A/V stream 404 may be identified by way of an associated portion of the text data. For example, a particular text string or phrase within the text data may be associated with one or more specific frames of the video data within the first A/V stream 404 so that the text string is presented to the user simultaneously with its associated video data frames. Therefore, the particular text string or phrase may provide an indication of a location of these video frames, as well as the portion of the audio data synchronized or associated with the frames.

The communication network 402 also transmits location information 406 to the receiving device 410. The location information 406 may be transmitted to the receiving device 410 together or separately from the first A/V stream 404. The location information 406 specifies locations within the first A/V stream 404 that are to be presented at varying presentation rates during presentation of the A/V data of the first A/V stream 404 by the receiving device 410. For example, if the first A/V stream 404 includes one or more segments of a television show interspersed with one or more interstitials, then the location information 406 may identify the locations of the segments, which are to be presented at a first presentation rate, and/or identify the locations of the interstitial, which are to be presented at a second presentation rate. Similarly, the location information 406 may be utilized to present the segments and/or the interstitials at varying audio levels.

The receiving device 410 is operable for processing the text data to identify the portions of the first A/V stream 404 and identify the presentation rates for each of the portions of the first A/V stream 404. The receiving device 410 outputs a second A/V stream 412 that includes the identified portions presented at varying rates for presentation by the display device 414.

Figure 5:
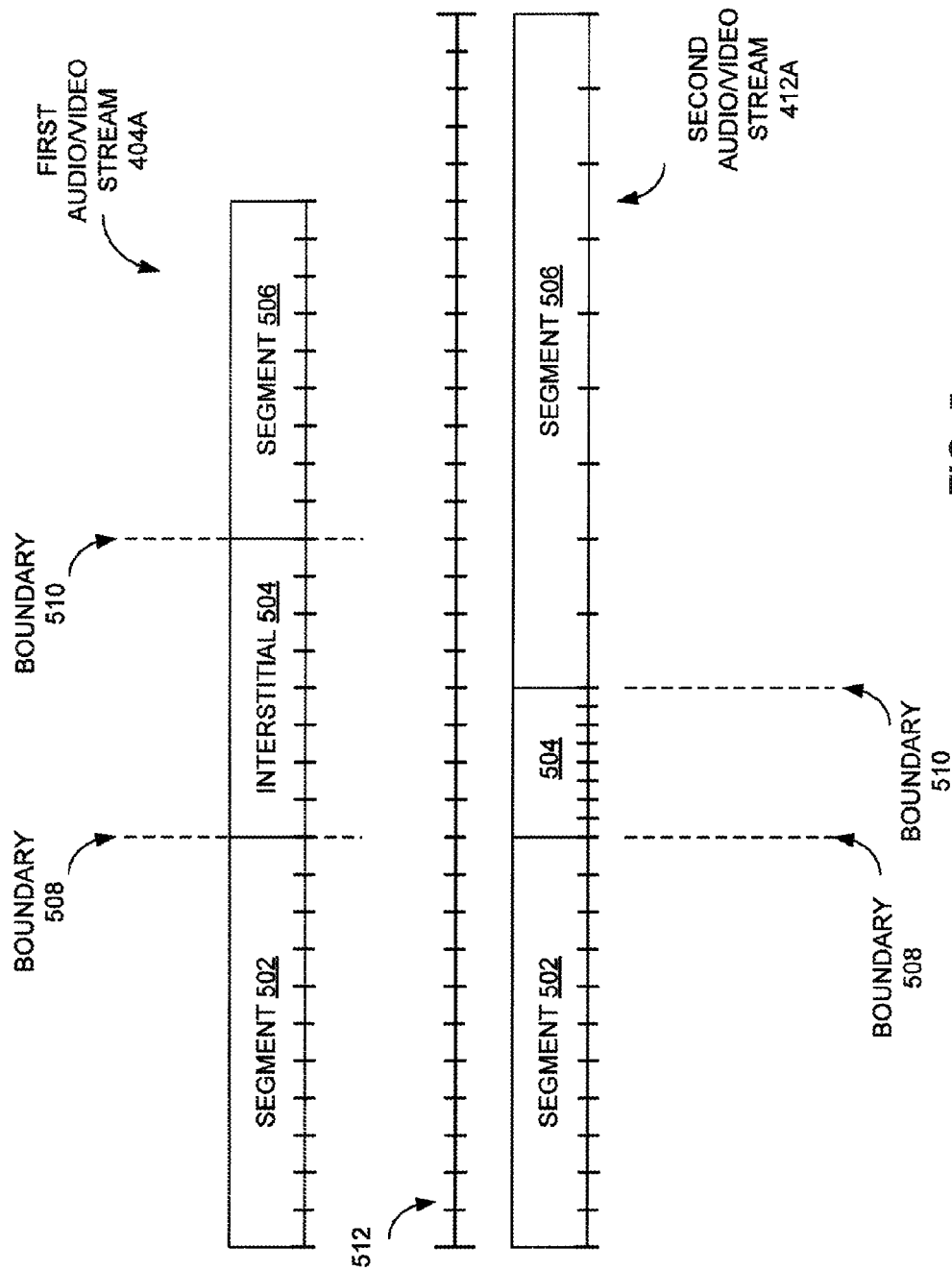
FIG. 5 illustrates an embodiment of a graphical representation of the first A/V stream received by the receiving device, and a second A/V stream outputted by the receiving device.

FIG. 5 illustrates an embodiment of a graphical representation of the first A/V stream 404A received by the receiving device 410, and a second A/V stream 412A outputted by the receiving device 410. More particularly, FIG. 5 illustrates an embodiment in which an interstitial from the first A/V stream 404A is presented at a faster presentation rate during presentation of the second A/V stream 412A and the segment 506 is presented at a slower presentation rate than in the first A/V stream 404A. FIG. 5 will be discussed in reference to the system 400 of FIG. 4.

The first A/V stream 404 includes a first A/V segment 502 of a show, an interstitial 504 and a second A/V segment 506 of the show. The time bar 512 illustrates the duration for each of the segment 502, interstitial 504 and the segment 506. Also indicated are beginning and ending boundaries 508 and 510 of the interstitial 504, which are indicated to the receiving device 410 (see FIG. 4) by way of the location information 406. It is to be recognized that the boundaries 508 and 510 of the interstitial 504 are also boundaries of the segments 502 and 506. The supplemental data of the A/V stream 404A is not shown in FIG. 5 to simplify the diagram.

In the specific example of FIG. 5 the boundary 508 (e.g., the ending boundary of segment 502) is the starting point at which the presentation of the interstitial 504 is to be modified during presentation in the second A/V stream 412A. Likewise, the boundary 510 (e.g., the beginning boundary of segment 506) is the ending point at which the interstitial 504 is to be presented at the modified presentation rate. As illustrated, the interstitial 504 is presented at a faster presentation rate in the second A/V stream 412A. The segment 506 is also presented at a modified presentation rate in the second A/V stream 412. More particularly, the segment 506 is presented at a slower presentation rate in the second A/V stream 412. As a result of the modifications to the presentation rates of the interstitial 504 and the segment 506, the second A/V stream 412A is longer in duration than the first A/V stream 404A. Similarly, the differing portions of the content, e.g., the segment 506 and the interstitial 504 may be presented at varying audio levels.

The boundaries 508 and 510 are identified based on the location of one or more video locations within the first A/V stream 404A. More particularly, the beginning and ending boundaries of a segment (or interstitial) of the first A/V stream 404A may be specified by a single video location within the segment. Thus, each segment may be identified by a unique video location within the first A/V stream 404A.

To specify a video location within the first A/V stream 404A, the location information 406 references a portion of the text data associated with the first A/V stream 404A. A video location within the first A/V stream 404A may be identified by a substantially unique text string within the text data that may be unambiguously detected by the receiving device 410. The text data may consist of a single character, several characters, an entire word, multiple consecutive words, or the like. Thus, the receiving device 410 may review the text data to identify the location of the unique text string. Because the text string in the text data is associated with a particular location within the first A/V stream 404A, the location of the text string may be referenced to locate the video location within the first A/V location.

In some embodiments, multiple video locations may be utilized to specify the beginning and ending boundaries of a segment. In at least one embodiment, a single video location is utilized to identify the beginning and ending boundaries of a segment. The video location may be located at any point within the segment, and offsets may be utilized to specify the beginning and ending boundaries of the segment relative to the video location. In one implementation, a human operator, of a content provider of the first A/V stream 404A, bears responsibility for selecting the text string, the video location and/or the offsets. In other examples, the text string, video location and offset selection occurs automatically under computer control, or by way of human-computer interaction. A node within the communication network 402 may then transmit the selected text string to the receiving device 410 as the location information 406, along with the forward and backward offset data.

Figure 6:
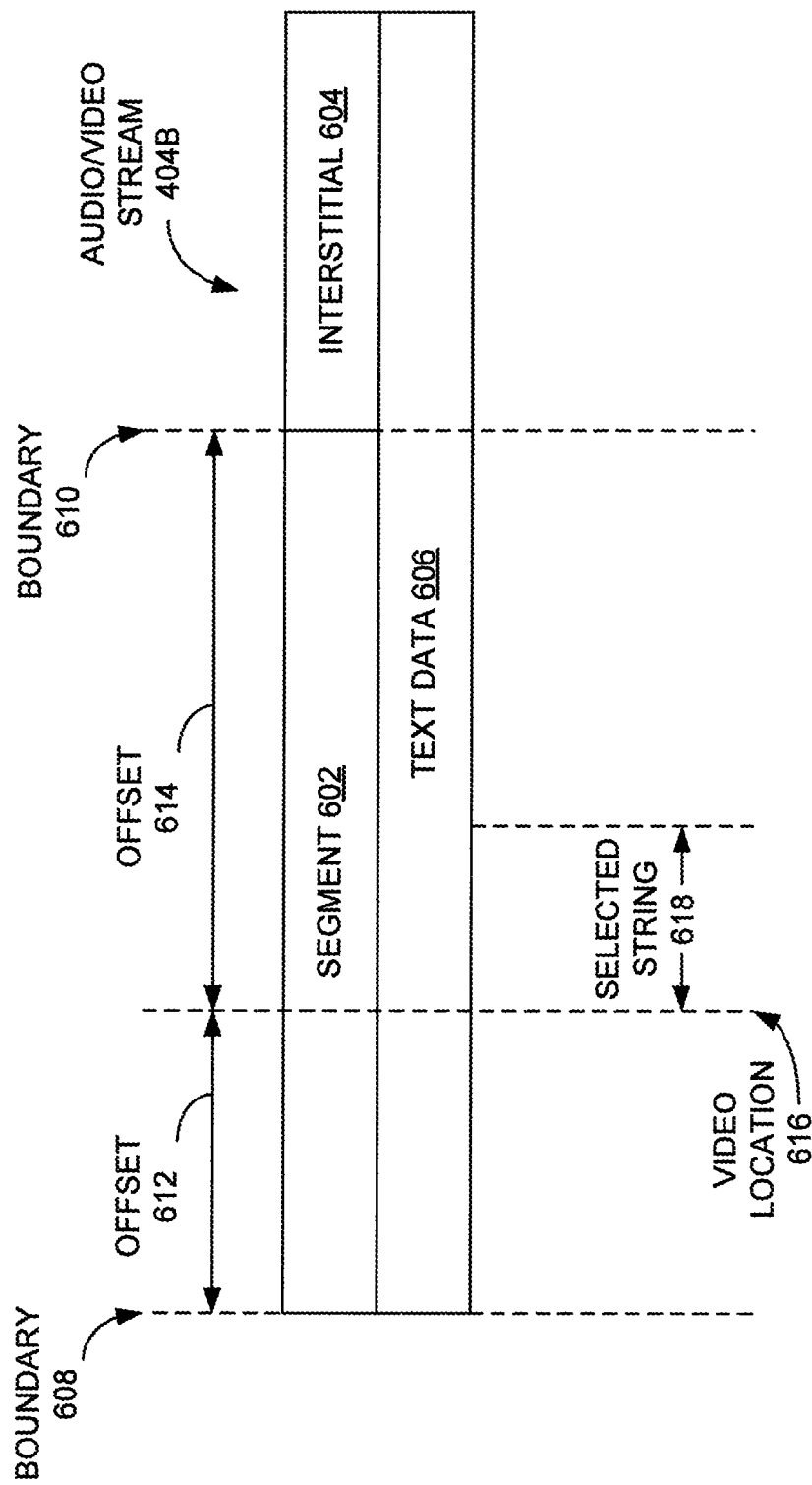
FIG. 6 illustrates an embodiment in which the boundaries of a segment of an A/V stream are identified based on a text string included within the text data associated with the A/V stream.

FIG. 6 illustrates an embodiment in which the boundaries of a segment of an A/V stream 404B are identified based on a text string included within the text data associated with the A/V stream 404B. FIG. 6 will be discussed in reference to system 400 of FIG. 4. The A/V stream 404B includes a segment 602, an interstitial 604 and text data 606. The segment 602 is defined by a boundary 608 and a boundary 610. The location information 406 received by the receiving device 410 identifies the segment 602 using a selected string 618 and offsets 612 and 614. Each of these components is discussed in greater detail below.

The receiving device 410 reviews the text data 606 to locate the selected string 618. As illustrated in FIG. 6, the selected string 618 is located at the video location 616. More particularly, in at least one embodiment, the beginning of the selected string 618 corresponds with the frame located at the video location 616. After locating the video location 616, the receiving device 410 utilizes the negative offset 612 to identify the beginning boundary 608. Likewise, the receiving device 410 utilizes the positive offset 614 to identify the ending boundaries 610. The offsets 612 and 614 are specified relative to the video location 616 to provide independence from the absolute presentation times of the video frames associated with the boundaries 608 and 610 within the A/V stream 404B. For example, two users may begin recording a particular program from two different affiliates (e.g., one channel in New York City and another channel in Atlanta). Thus, the absolute presentation time of the boundaries 608 and 610 will vary within the recordings. The technique described herein locates the same video frames associated with the boundaries 608 and 610 regardless of their absolute presentation times within a recording.

In at least one embodiment, the receiving device 410 modifies an audio level of content between specified boundaries. For example, the receiving device 410 may lower the volume of the audio data corresponding with the interstitial 604 or even mute the volume of the audio data corresponding with the interstitial 604. The receiving device 410 may also raise the volume of audio data between specified boundaries. For example, the receiving device 410 may raise the volume of the audio data of the segment 602 between the boundaries 608 and 610.

Depending on the resiliency and other characteristics of the text data, the node of the communication network 402 generating and transmitting the location information 406 may issue more than one instance of the location information 406 to the receiving device 410. For example, text data, such as closed captioning data, is often error-prone due to transmission errors and the like. As a result, the receiving device 410 may not be able to detect some of the text data, including the text data selected for specifying the video location 616. To address this issue, multiple unique text strings may be selected from the text data 606 of the A/V stream 404B to indicate multiple video locations (e.g., multiple video locations 616), each having a different location in the A/V stream 404B. Each string has differing offsets relative to the associated video location that point to the same boundaries 608 and 610. The use of multiple text strings (each accompanied with its own offset(s)) may thus result in multiple sets of location information 406 transmitted over the communication network 402 to the receiving device 410, each of which is associated with the segment 602. Each set of location information 406 may be issued separately, or may be transmitted in one more other sets.

Figure 7:
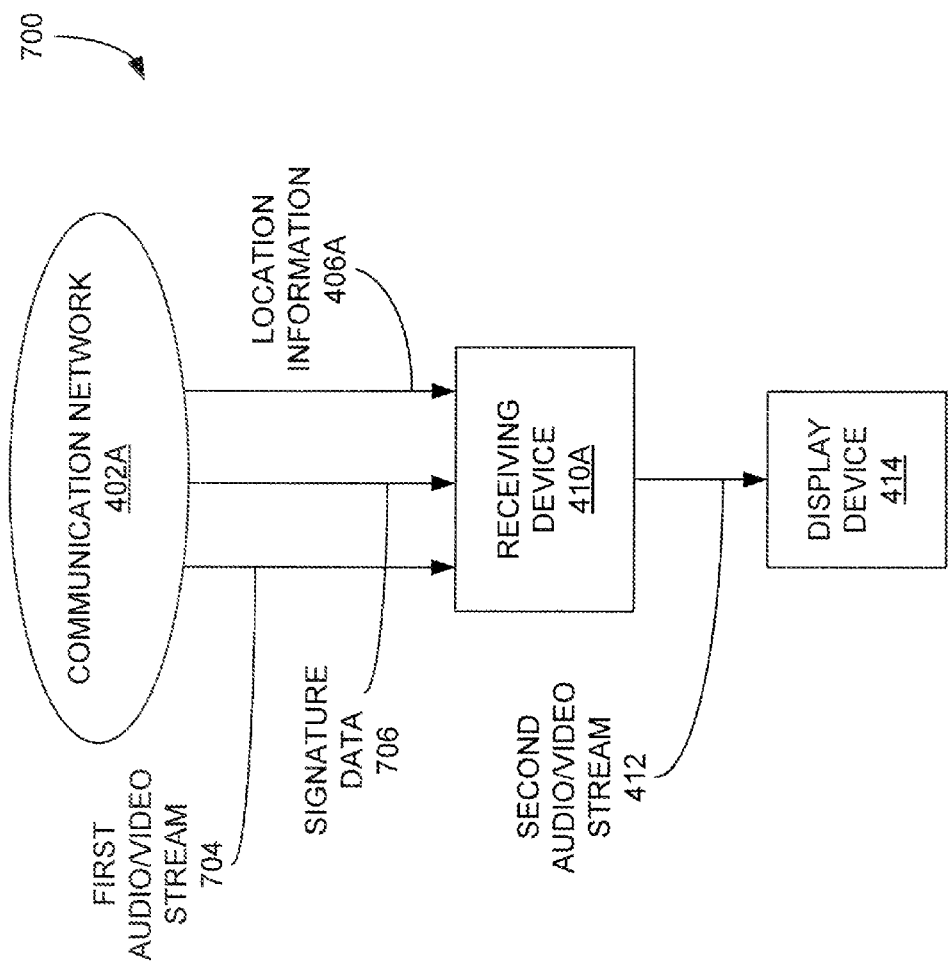
FIG. 7 illustrates an embodiment of a system for presenting content to a user.

Described above are two techniques for identifying locations within presentation stream. The two techniques may be utilized together to enhance the location identification process performed by a receiving device. FIG. 7 illustrates an embodiment of a system 700 for presenting content to a user. The system of FIG. 7 is operable for presenting A/V content from a contiguous block of A/V data at varying presentation rates. The system 700 includes a communication network 402A, a receiving device 410A and a display device 414. Each of these components is discussed in greater detail below. The system 700 of FIG. 7 may include other devices, components or elements not illustrated for the sake of brevity. Discussion of components common to FIG. 4 is omitted herein for the sake of brevity.

The receiving device 410A is operable to receive a first A/V stream 404, signature data 706 and location information 406A. The signature data 706 may be similar to the signature data 106 of FIG. 1. The location information 406A references closed captioning data to identify a video location within the first A/V stream 404. Additionally, the location information includes at least one off-set specified relative to the video location. The receiving device 410A is operable to identify portions of the A/V stream 404 based on the signature data 706 and the location information 406A. Responsive to identifying portions of the first A/V stream 404, the receiving device 410 presents particular portions of the first A/V stream 404 at varying presentation rates to output a second A/V stream 412 for presentation by the display device 414.

In at least one embodiment, the receiving device 410A processes closed captioning data associated with the first A/V stream 404 to narrow the amount of data to be processed using the signature data 706. The first A/V stream 404 is processed to identify a video location within the first A/V stream 404 using the signature data 706. Based upon the video location, boundaries of one or more segments of the first A/V stream 404 may be located using off-set data specified by the location information 406.

Figure 8:
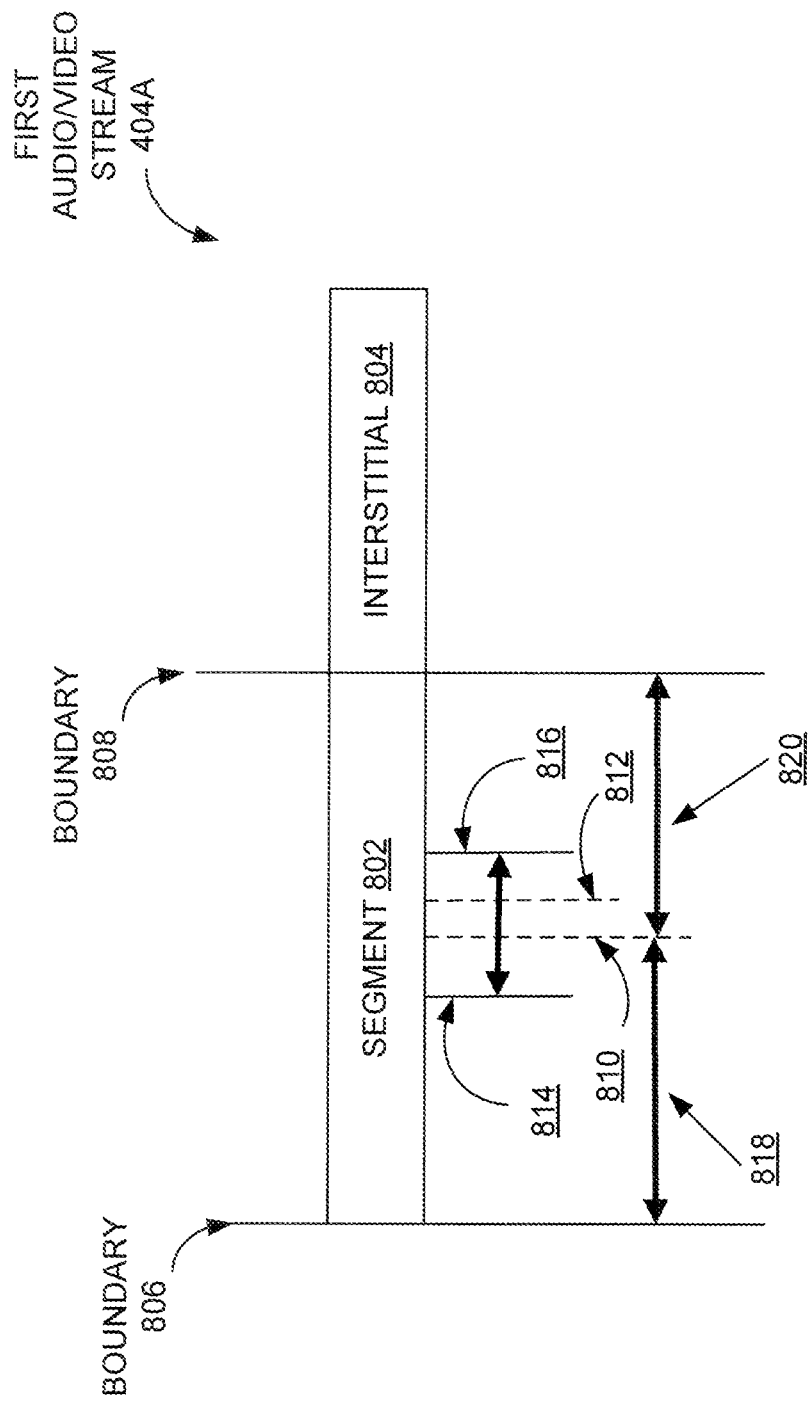
FIG. 8 illustrates a graphical representation of the first presentation stream of FIG. 7.

FIG. 8 illustrates a graphical representation of the first presentation stream of FIG. 7. The first A/V stream 404A includes a segment 802 and an interstitial 804. The segment 802 is bounded by boundaries 806 and 808.

The closed captioning data associated with the first A/V stream 404 is utilized to identify a first location within the first A/V stream 404. The location information 406 specifies a video location 810 utilized to identify the boundaries 806 and 808. First, the receiving device 410A processes the closed captioning data associated with the first A/V stream 404 to identify an intermediate location 812 within the first A/V stream 404. Based upon locating the intermediate location 812, the receiving device 410A identifies search boundaries 814 and 816. The video location 810 is located within the search boundaries 814 and 816. In at least one embodiment, the search boundaries 814 and 816 are specified as off-sets relative to the intermediate location 812.

Responsive to identifying the boundaries 814 and 816, the receiving device 410A processes the content of the first A/V stream 404 within the boundaries 814 and 816 to identify the video location 810 corresponding with the signature data 706. The processing of the content within the search boundaries may be performed as described above in reference to FIG. 1. Responsive to identifying the video location 810, the receiving device 410A utilizes off-sets 818 and 820 to identify the boundaries 806 and 808 of the segment 802.

The receiving device 410A may then operate to output the content within the boundaries 806 and 808 at a first presentation rate. In at least one embodiment, the first presentation rate is a real-time presentation rate of the segment 802, e.g., the same presentation rate of the segment 802 as originally transmitted to the receiving device 410A. The receiving device 410A may then output the interstitial 804 at a second presentation rate. In at least one embodiment, the second presentation rate is greater than the first presentation rate. In other words, the interstitial 804 is shown at a faster rate than the segment 802. Similar processes may be performed to identify the boundaries of other portions of the first A/V stream 404 to determine a presentation rate to present the other portions of the first A/V stream 404.

In at least one embodiment, the receiving device 410A may be configured to determine whether closed captioning data has been shifted from the original video content corresponding with the closed captioning data. In other words, the receiving device 410A first processes the first A/V stream 404 using the above described closed captioning technique, and then utilizes the signature data technique described above to further refine the identification of boundaries (or locations) within the first A/V stream 404. For example, particular words of closed captioning data may be shifted in either direction from the corresponding video frame. Thus, the receiving device 410A may be operable to initially identify an intermediate location within the first A/V stream 404 based upon the location information 406. The intermediate location may be identified as described above in reference to FIGS. 4-6. Thus, the off-sets corresponding with the intermediate location may point to locations other than the boundaries of a segment.

FIG. 9 illustrates an embodiment in which intermediate boundaries of a segment of an A/V stream 900 are identified based on a text string included with the text data associated with the A/V stream 900. FIG. 9 will be discussed in reference to system 700 of FIG. 7. The A/V stream 900 includes a segment 902, an interstitial 904 and text data 906. Each of these components is discussed in greater detail below.

In the illustrated example, the location information 406A (see FIG. 7) is intended to identify a video location 916 within the first A/V stream 900. More particularly, a selected string of text data specified by the location information 406A (see FIG. 7) corresponds with the video location 916. Off-sets associated with the video location point to boundaries of the segment 902. However, the text data 906 for the A/V stream 900 has been shifted to the right. This means that a location identified based on the location information 406A will point to incorrect boundaries for the segment 902. In other words, the boundaries of the segment 902 identified by the process will be shifted to the right.

To remedy the shifting, the location information 406A (see FIG. 7) received by the receiving device 410A identifies the segment 902 using a selected string 918 and offsets 912 and 914. In other words, the location information 406A of FIG. 7 is comprised of the selected string 918 and offsets 91.2 and 914. The receiving device 410A reviews the text data 906 to locate the selected string 918. As illustrated in FIG. 9, the selected string 918 is located at the intermediate location 920. More particularly, in at least one embodiment, the beginning of the selected string 918 corresponds with the frame located at the intermediate location 920. After locating the intermediate location 920, the receiving device 410A utilizes the negative offset 912 to identify the intermediate beginning boundary 908. Likewise, the receiving device 410A utilizes the positive offset 914 to identify the intermediate ending boundary 910.

Next, the receiving device 410A compares the signature data 706A (see FIG. 7) to the audio and/or video data associated with the intermediate location 920 to determine whether the A/V data is within a specified tolerance compared with the signature data 706A. In other words, the comparison process minimizes the tolerance between the signature data 706A and the audio and/or video data at a particular location. If the comparison results in value greater than the specified tolerance, then the receiving device 410A identifies that the closed captioning data has been shifted from the original video location 916 and begins to identify the amount of the shift.

In at least one embodiment, receiving device 410A may determine the shift amount by moving in either direction from the intermediate location 920 and comparing the signature data 706 with the A/V data at the shifted location. If the A/V data at the shifted location results in a comparison within a specified tolerance, then the receiving device identifies the shift amount, and adjusts the intermediate boundaries 908 and 910 accordingly to map to the boundaries of the segment 902. If the comparison is outside of the specified tolerance, then the receiving device 410A keeps shifting in one direction or the other and performs a similar comparison process until the video location 916 is identified.

The comparison of the signature data 706 and the A/V data of the first A/V stream may be performed as described above in reference to FIG. 7. In at least one embodiment, a subtraction process may be performed to locate the video location 916. FIG. 10 illustrates an embodiment of a graphical representation of a subtraction process performed to determine an offset between the video location 916 and the intermediate location 920. The signature data 706A is initially subtracted from the A/V data 1002 corresponding with the intermediate location 920. If the subtraction results in a value greater than a specified tolerance, then the signature data 706A is shifted from the intermediate location 920 and another subtraction process is performed. The shifting and subtraction process is repeated until the receiving device 410A identifies the video location 916, as illustrated in FIG. 11. The shifting process results in the identification of the adjustment off-set 1102. As described above, the off-sets 912 and 914 (see FIG. 9) may then be adjusted by the adjustment off-set 1102 to map to the beginning and ending boundaries of the segment 902.

While the aforementioned process has been discussed in reference to signature video data, a similar identification process may be utilized in relation to signature audio data. For example, the intermediate location 920 may be associated with a particular location of corresponding audio data. Thus, offsets may be utilized to locate the video location 916 in relation to the location of the signature audio data.

Figure 12:
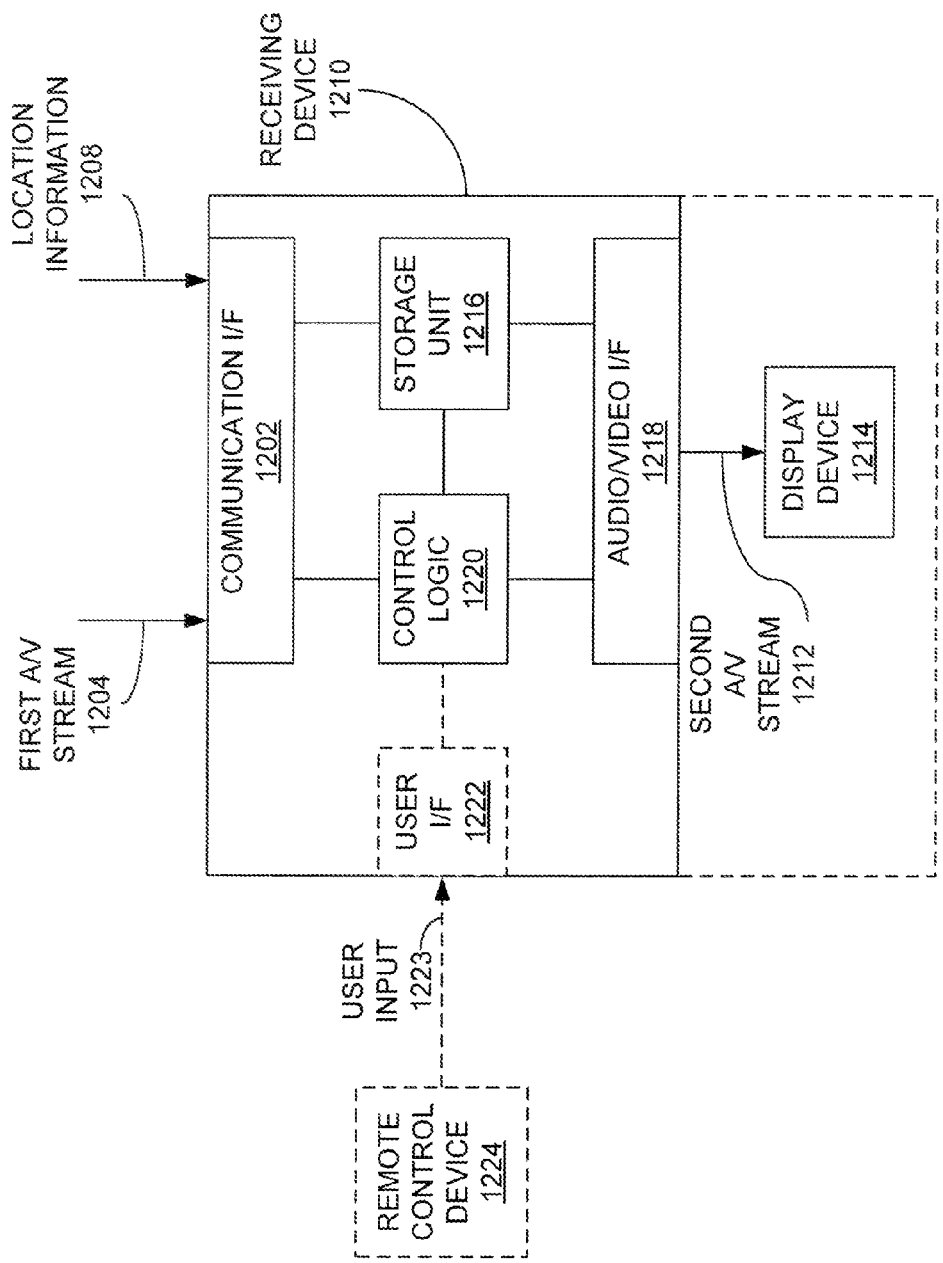
FIG. 12 illustrates a more explicit view of a receiving device according to one embodiment.

A more explicit view of a receiving device 1210 according to one embodiment is illustrated in FIG. 12. The receiving device 1210 includes a communication interface 1202, a storage unit 1216, an A/V interface 1218 and control logic 1220. In some implementations, a user interface 1222 may also be employed in the receiving device 1210. Other components possibly included in the receiving device 1210, such as demodulation circuitry, decoding logic, and the like, are not shown explicitly in FIG. 12 to facilitate brevity of the discussion.

The communication interface 1202 may include circuitry to receive a first A/V stream 1204 and location information 1208. If the receiving device 1210 is a satellite set-top box, then the communication interface 1202 may be configured to receive satellite programming, such as the first A/V stream 1204, via an antenna from a satellite transponder. If, instead, the receiving device 1210 is a cable set-top box, then the communication interface 1202 may be operable to receive cable television signals and the like over a coaxial cable. In either case, the communication interface 1202 may receive the location information 1208 by employing the same technology used to receive the first A/V stream 1204. In another implementation, the communication interface 1202 may receive the location information 1208 by way of another communication technology, such as the internet, a standard telephone network, or other means. Thus, the communication interface 1202 may employ one or more different communication technologies, including wired and wireless communication technologies, to communicate with a communication network, such as the communication network 102 of FIG. 1.

Coupled to the communication interface 1202 is a storage unit 1216, which is configured to store the first A/V stream 1204. The storage unit 1216 may include any storage component configured to store one or more such A/V streams. Examples include, but are not limited to, a hard disk drive, an optical disk drive, and flash semiconductor memory. Further, the storage unit 1216 may include either or both volatile and nonvolatile memory.

Communicatively coupled with the storage unit 1216 is an A/V interface 1218, which is configured to output A/V streams from the receiving device 1210 to a display device 1214 for presentation to a user. The A/V interface 1218 may incorporate circuitry to output the A/V streams in any format recognizable by the display device 1214, including composite video, component video, Digital Visual Interface (DVI), High-Definition Multimedia Interface (HDMI), Digital Living Network Alliance (DLNA), Ethernet, Multimedia over Coax Alliance (MOCA), WiFi and IEEE 1394. Data may be compressed and/or transcoded for output to the display device 1214. The A/V interface 1218 may also incorporate circuitry to support multiple types of these or other A/V formats. In one example, the display device 1214, such as a television monitor or similar display component, may be incorporated within the receiving device 1210, as indicated earlier.

In communication with the communication interface 1202, the storage unit 1216, and the A/V interface 1218 is control logic 1220 configured to control the operation of each of these three components 1202, 1216, 1218. In one implementation, the control logic 1220 includes a processor, such as a microprocessor, microcontroller, digital signal processor (DSP), or the like for execution of software configured to perform the various control functions described herein. In another embodiment, the control logic 1220 may include hardware logic circuitry in lieu of, or in addition to, a processor and related software to allow the control logic 1220 to control the other components of the receiving device 1210.

Optionally, the control logic 1220 may communicate with a user interface 1222 configured to receive user input 1223 directing the operation of the receiving device 1210. The user input 1223 may be generated by way of a remote control device 1224, which may transmit the user input 1223 to the user interface 1222 by the use of, for example, infrared (IR) or radio frequency (RF) signals. In another embodiment, the user input 1223 may be received more directly by the user interface 1222 by way of a touchpad or other manual interface incorporated into the receiving device 1210.

The receiving device 1210, by way of the control logic 1220, is configured to receive the first A/V stream 1204 by way of the communication interface 1202, and store the A/V stream 1204 in the storage unit 1216. The location information 1208 is also received at the communication interface 1202, which may pass the location information 1208 to the control logic 1220 for processing. In another embodiment, the location information 1208 may be stored in the storage unit 1216 for subsequent retrieval and processing by the control logic 1220.

At some point after the location information 1208 is processed, the control logic 1220 generates and transmits a second A/V stream 1212 over the A/V interface 1218 to the display device 1214. In one embodiment, the control logic 1220 generates and transmits the second A/V stream 1212 in response to the user input 1223. For example, the user input 1223 may command the receiving device 1210 to output the first A/V stream 1204 to the display device 1214 for presentation. In response, the control logic 1220 instead generates and outputs the second A/V stream 1212. As described above in reference to FIG. 1, the second A/V stream 1212 includes portions of the A/V data of the first A/V stream 1204 presented at varying presentation streams.

Depending on the implementation, the second A/V stream 1212 may or may not be stored as a separate data structure in the storage unit 1216. In one example, the control logic 1220 generates and stores the entire second A/V stream 1212 in the storage unit 1216. The control logic 1220 may further overwrite the first A/V stream 1204 with the second A/V stream 1212 to save storage space within the storage unit 1216. Otherwise, both the first A/V stream 1204 and the second A/V stream 1212 may reside within the storage unit 1216.

In another implementation, the second A/V stream 1212 may not be stored separately within the storage unit 1216. For example, the control logic 1220 may instead generate the second A/V stream 1212 "on the fly" by transferring selected portions of the audio data and the video data of the first A/V stream 1204 in presentation order from the storage unit 1216 to the A/V interface 1218. If applicable, portions of the first A/V stream 1204 may be processed and output at differing presentation rates (e.g., at faster or slower presentation rates).

In one implementation, a user may select by way of the user input 1223 whether the first A/V stream 1204 or the second A/V stream 1212 is outputted to the display device 1214 by way of the A/V interface 1218. In other words, the user is able to select whether to watch the first A/V stream 1204 at the real-time presentation rate (e.g., 1×) or whether to watch portions of the first A/V stream 1204 at differing presentation rates (e.g., watching the commercials automatically at a faster presentation rate). In another embodiment, a content provider of the first A/V stream 1204 may prevent the user from maintaining such control by way of additional information delivered to the receiving device 1210.

Figure 13:
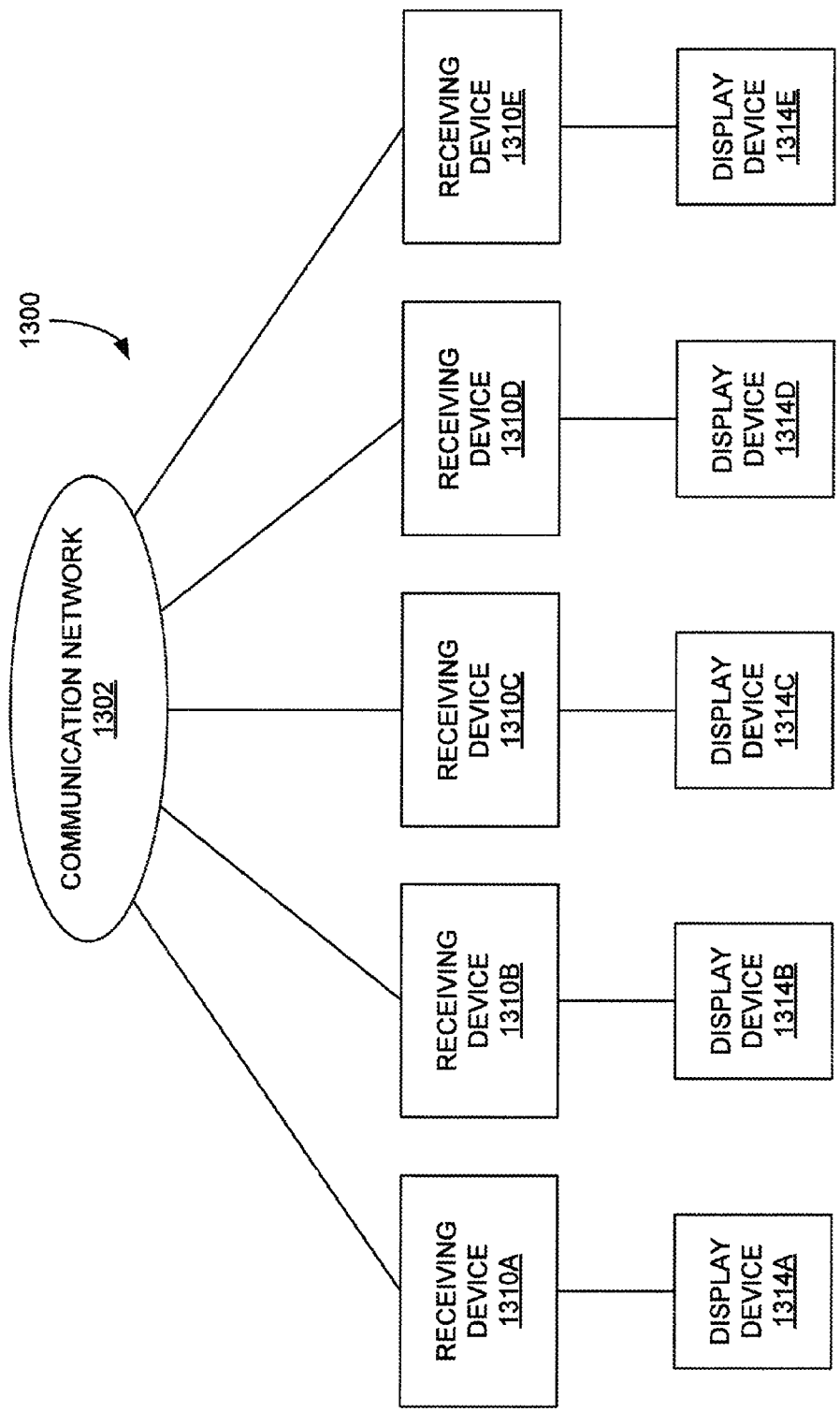
FIG. 13 illustrates an embodiment of a system including multiple receiving devices coupled to a communication network to receive A/V streams.

In a broadcast environment, such as that depicted in the system 1300 of FIG. 13, multiple receiving devices 1310A-E may be coupled to a communication network 1302 to receive A/V streams, any of which may be recorded, in whole or in part, by any of the receiving devices 1310A-E. In conjunction with any number of these A/V streams, location information for portions of the A/V stream which are to be presented at varying presentation rates and/or varying audio levels may be transferred to the multiple receiving devices 1310A-E. In response to receiving the A/V streams, each of the receiving devices 1310A-E may record any number of the A/V streams received. For any associated location information that are transmitted over the communication network 1302, each receiving device 1310A-E may then review whether the received location information are associated with an A/V stream currently stored in the device 1310A-E. If the associated stream is not stored therein, then the receiving device 1310A-E may delete or ignore the related and location information received.

In another embodiment, instead of broadcasting each location information data set, the transfer of an A/V stream stored within the receiving device 1310A-E to an associated display device 1314A-E may cause the receiving device 1310A-E to query the communication network 1302 for any outstanding location information that apply to the stream to be presented. For example, the communication network 1302 may comprise an internet connection. As a result, the broadcasting of each portion of location information would not be required, thus potentially reducing the amount of consumed bandwidth over the communication network 1302.

Figure 14:
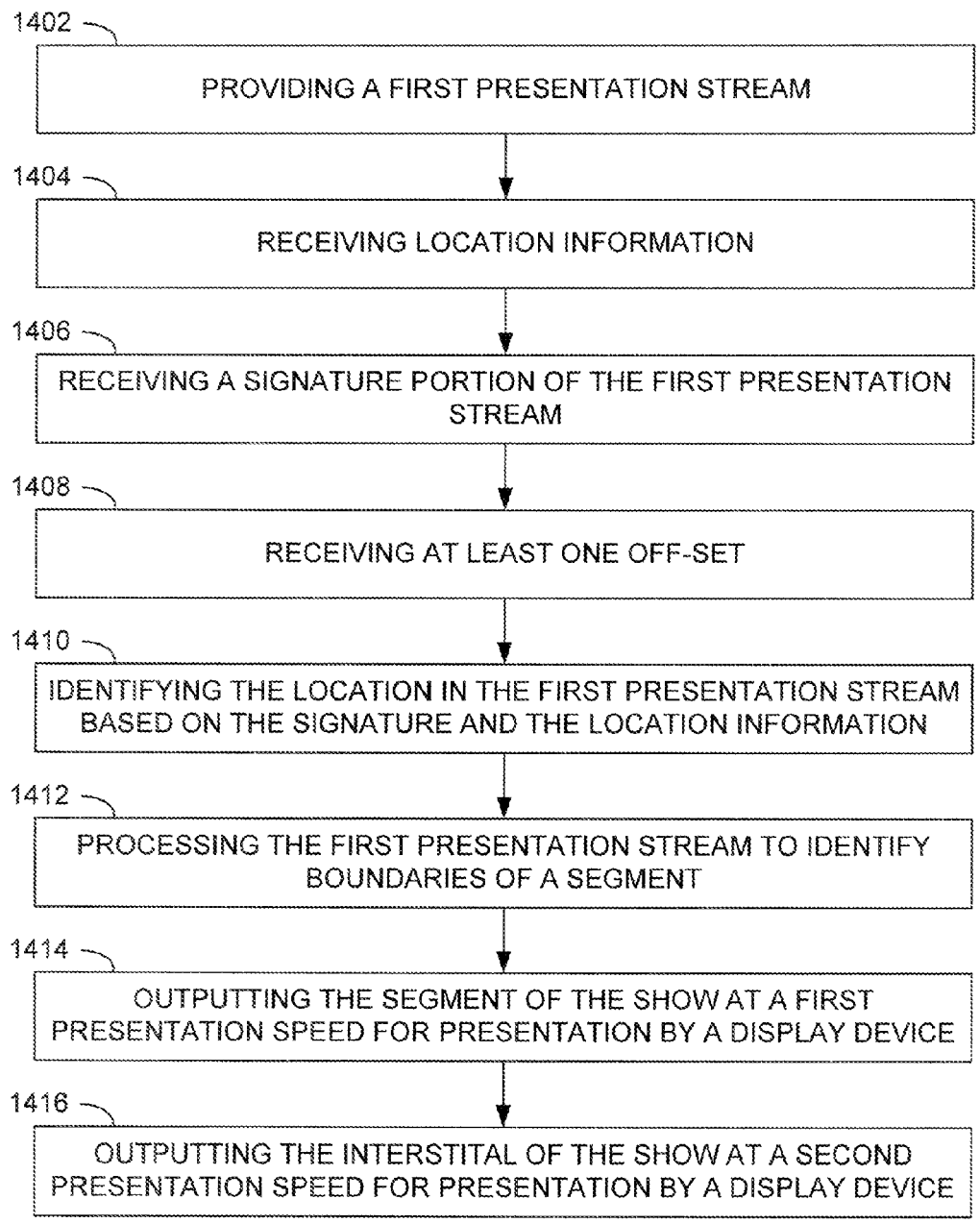
FIG. 14 illustrates an embodiment of a process for outputting a stream of data.

FIG. 14 illustrates an embodiment of a process for outputting a stream of data. More particularly, the process of FIG. 14 is operable for presenting portions of a presentation stream at varying presentation rates (e.g., fast forwarding through commercials). The process of FIG. 14 will be discussed in reference to modifying the presentation rate of interstitials in a presentation stream, but it is to be appreciated that the process of FIG. 14 may be operable to modify any portion of a presentation stream. The process of FIG. 14 may include other operations not illustrated for the sake of brevity.

The process includes providing a first presentation stream including at least one segment of a show and at least one interstitial of the show (operation 1402). In at least one embodiment, operation 1402 includes receiving the presentation stream from an external source. Operation 1402 may optionally include storing the first presentation stream for subsequent playback. In other embodiment, operation 1402 may include accessing the first presentation stream from a storage device.

The process further comprises receiving location information referencing a location within the first presentation stream (operation 1404). The process also includes receiving a signature of a portion of the first presentation stream corresponding with the location (operation 1406) and receiving at least one-offset, specified relative to the location (operation 1408).

The process further includes identifying the location in the first presentation stream based on the signature and the location information (operation 1410). Responsive to identifying the location, the process includes processing the first presentation stream to identify boundaries of the segment of the show based on the identified location and the off-set (operation 1412). The process further includes outputting the segment of the show at a first presentation rate for presentation by a display device (operation 1414) and outputting the interstitial of the show at a second presentation rate for presentation by the display device (operation 1416). In at least one embodiment, the second presentation rate is greater than the first presentation rate.

Figure 15:
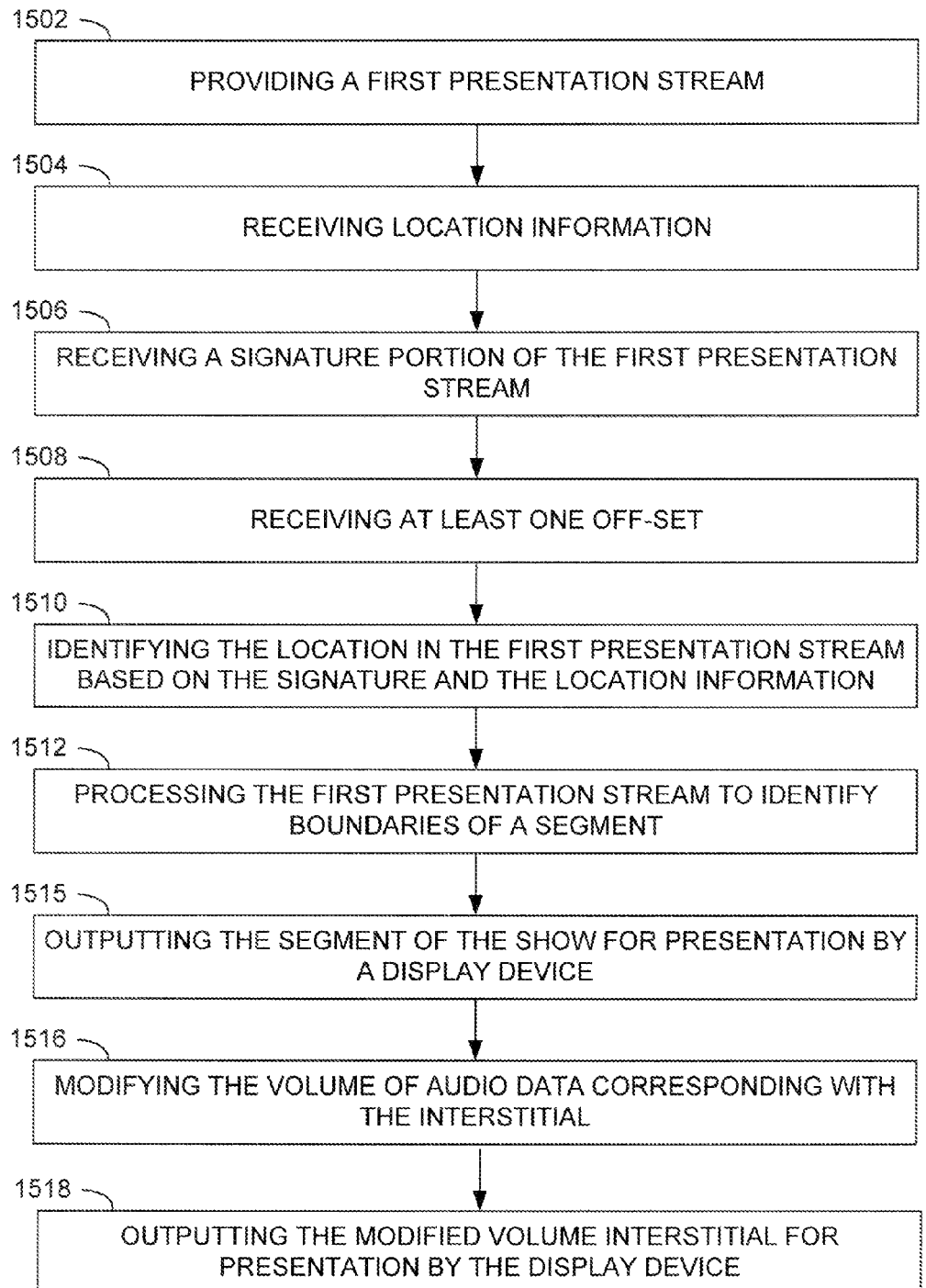
FIG. 15 illustrates an embodiment of a process for outputting a stream of data.

FIG. 15 illustrates an embodiment of a process for outputting a stream of data. More particularly, the process of FIG. 15 is operable for presenting portions of a presentation stream at varying audio levels. The process of FIG. 15 will be discussed in reference to modifying the audio level of interstitials in a presentation stream, but it is to be appreciated that the process of FIG. 15 may be operable to modify any portion of a presentation stream. The process of FIG. 15 may include other operations not illustrated for the sake of brevity.

The process includes providing a first presentation stream including at least one segment of a show and at least one interstitial of the show (operation 1502). The process further comprises receiving location information referencing a location within the first presentation stream (operation 1504). The process also includes receiving a signature of a portion of the first presentation stream corresponding with the location (operation 1506) and receiving at least one-offset, specified relative to the location (operation 1508).

The process further includes identifying the location in the first presentation stream based on the signature and the location information (operation 1510). Responsive to identifying the location, the process includes processing the first presentation stream to identify boundaries of the segment of the show based on the identified location and the off-set (operation 1512).

The process further includes outputting the segment of the show for presentation by a display device (operation 1514). The process further includes modifying a volume of audio data corresponding with the interstitial (operation 1516) and outputting the modified volume interstitial for presentation by the display device (operation 1518). Operation 1516 may include lowering the audio level, raising the audio level or muting the audio data corresponding with the interstitial, depending on desired design criteria.

Figure 16:
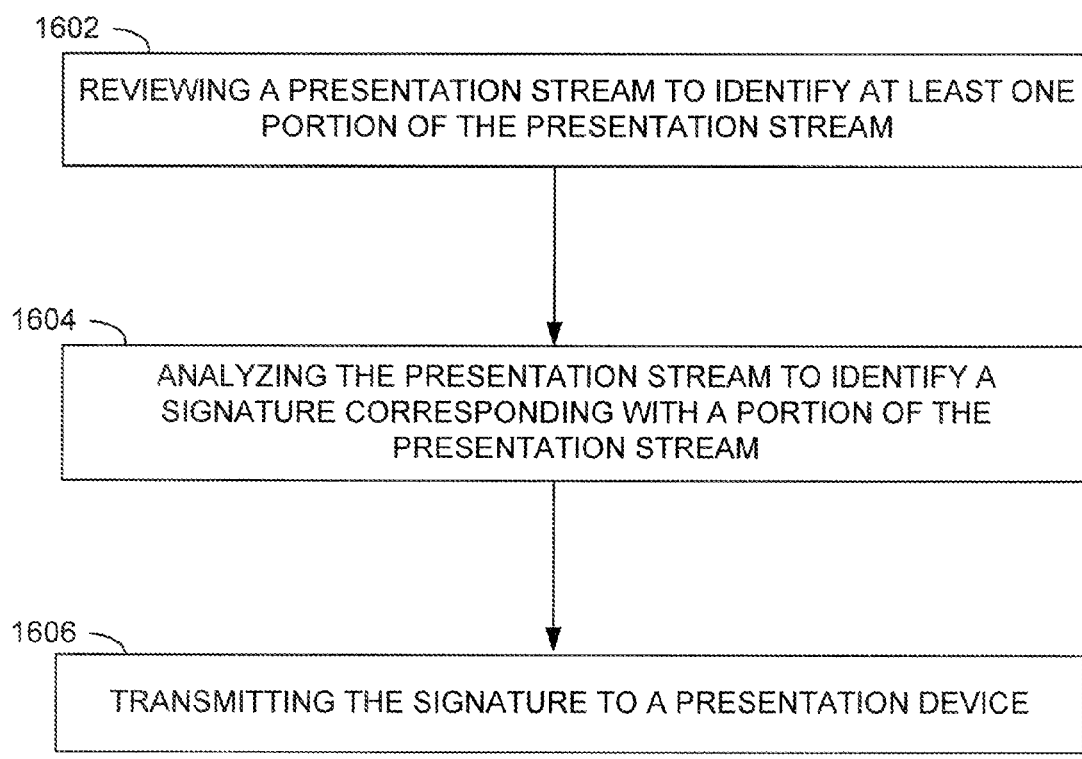
FIG. 16 illustrates an embodiment of a process for creating location information for utilization by the processes of FIGS. 14 and 15.

FIG. 16 illustrates an embodiment of a process for creating location information for utilization by the processes of FIGS. 14 and 15. The operation of FIG. 16 is discussed in reference to location information and signature information for a television program. However, it is to be appreciated that the operation of the process of FIG. 16 may be applied to create location information and signature data for other types of presentation stream content. The operations of the process of FIG. 16 are not all-inclusive, and may comprise other operations not illustrated for the sake of brevity.

After recording a television show, a human operator reviews a presentation stream to identify at least one portion of the presentation stream to present at a modified presentation rate during subsequent presentation or varying audio levels (operation 1602). For example, the human operator may identify the boundaries of interstitials of a television program.

The process further includes analyzing the presentation stream to identify a signature corresponding with a portion of the presentation stream that identifies at least one boundary of the portion of the presentation stream (operation 1604). For example, the process may include identifying a particular sample of audio data, video data or a combination thereof that is significantly unique within the presentation stream to identify a particular video location. In at least one embodiment, operation 1604 includes identifying a significantly unique average luminance value of a particular frame or frames of video data, or a significantly unique luminance transition value between two frames. In some embodiments, operation 1604 may include identifying a particular sample of output of audio data, such as an output power, that is significantly unique to identify the particular location in the presentation stream. If the identified location is not located at the boundary of the segment, then the process further includes determining an offset of the boundary relative to the location of the signature. If the video location identifies multiple boundaries, then multiple off-sets may be determined that each point to a separate boundary.

The process further includes transmitting the signature to a presentation device (operation 1606). The presentation device utilizes the signature to identify the boundaries of the interstitial and modify the presentation rate of the interstitial during presentation of the presentation stream or varying audio levels. If operation 1604 results in the identification of off-set data, then operation 1606 further includes transmitting the off-set data to the presentation device in association with the signature.

In accordance with the teachings above, a presentation device may also utilize text data to identify boundaries of a segment. Thus, the process of FIG. 16 may also include parsing text data associated with the audio/video stream to identify a text string in the text data that identifies the boundary. For example, a significantly unique text string may be identified that is proximate a particular segment of content. The text string is then provided to the presentation device for utilization in association with the signature data as defined above to identify portions of the audio/video stream to present at varying presentation rates during playback or varying audio levels.

Although specific embodiments were described herein, the scope of the invention is not limited to those specific embodiments. The scope of the invention is defined by the following claims and any equivalents therein.

What is claimed is:

1. A method for processing an audio/video stream, the method comprising:
   providing an audio/video stream including at least one segment of a show, at least one interstitial of the show and closed captioning data;
   receiving location information for the audio/video stream, the location information including a text string associated with a particular video location within the audio/video stream, and the location information including offset data relative to the particular video location, wherein the location information is received separately from the audio/video stream;
   processing the closed captioning data to locate an instance of the text string in the closed captioning data, and to locate a beginning of the instance of the text string in the closed captioning data;
   identifying a text string beginning location of the audio/video stream, the identified text string beginning location corresponding to the beginning of the text string, wherein the particular video location corresponds to the identified text string beginning location;
   utilizing the offset data relative to the particular video location, and the identified text string beginning location, to identify boundaries of a segment of the show to be presented and boundaries of an interstitial within the audio/video stream;
   outputting the segment of the show for presentation by a display device;
   modifying a volume of audio data corresponding with the interstitial to obtain a modified volume segment of interstitial content; and
   outputting the modified volume segment of interstitial content for presentation by the display device.

2. The method of claim 1, wherein modifying the volume of the audio data further comprises:
   muting the volume of the audio data corresponding with the interstitial.

3. The method of claim 1, further comprising:
   receiving a signature of a portion of the audio/video stream associated with the identified location; and
   processing the audio/video stream to identify the boundaries based on processing of the signature.

4. The method of claim 3, wherein the offset data in the location information includes beginning and ending offsets, associated with the text string, that are specified relative to the particular video location, the beginning and ending offsets identifying beginning and ending locations of the segment of the show, and wherein the method further comprises:
   processing the closed captioning data to identify an intermediate location within the audio/video stream corresponding with presentation of the text string;
   processing the audio/video stream to identify the video location based on the signature;
   determining an adjustment offset between the intermediate location and the video location;
   adjusting the beginning and ending offsets based on the adjustment offset; and
   identifying the beginning location and the ending location of the at least one segment in the audio/video stream based on the adjusted beginning and ending offsets.

5. A method for processing an audio/video stream, the method comprising:
   providing an audio/video stream including at least one segment of a show, at least one interstitial of the show and closed captioning data;
   receiving location information for the audio/video stream, the location information including a text string associated with a particular video location within the audio/video stream, and the location information including offset data relative to the particular video location, wherein the location information is received separately from the audio/video stream;
   processing the closed captioning data to locate an instance of the text string in the closed captioning data, and to locate a beginning of the instance of the text string in the closed captioning data;
   identifying a text string beginning location of the audio/video stream, the identified text string beginning location corresponding to the beginning of the text string, wherein the particular video location corresponds to the identified text string beginning location;
   utilizing the offset data relative to the particular video location, and the identified text string beginning location, to identify boundaries of a segment of the show to be presented and boundaries of an interstitial within the audio/video stream;
   outputting the segment of the show at a first presentation rate for presentation by a display device; and
   outputting the interstitial of the show at a second presentation rate for presentation by the display device.

6. The method of claim 5, wherein the second presentation rate is greater than the first presentation rate.

7. The method of claim 5, further comprising:
   receiving a signature of a portion of the audio/video stream associated with the identified location; and
   processing the audio/video stream to identify the boundaries based on processing of the signature.

8. The method of claim 7, wherein the offset data in the location information includes beginning and ending offsets, associated with the text string, that are specified relative to the particular video location, the beginning and ending offsets identifying beginning and ending locations of the segment of the show, and wherein the method further comprises:
processing the closed captioning data to identify an intermediate location within the audio/video stream corresponding with presentation of the text string;
processing the audio/video stream to identify the video location based on the signature;
determining an adjustment offset between the intermediate location and the video location;
adjusting the beginning and ending offsets based on the adjustment offset; and
identifying the beginning location and the ending location of the at least one segment in the audio/video stream based on the adjusted beginning and ending offsets.

9. A digital video recorder comprising:
a communication interface that receives an audio/video stream including at least one segment of a show, at least one interstitial of the show and closed captioning data;
a storage medium;
control logic communicatively coupled to the communication interface and the storage medium that:
coordinates storage of the audio/video stream onto the storage medium;
receives location information for the audio/video stream, the location information including a text string associated with a video location within the audio/video stream, and the location information including at least one offset specified relative to the video location, wherein the location information is received separately from the audio/video stream;
processes the closed captioning data to locate an instance of the text string in the closed captioning data, and to locate a beginning of the instance of the text string in the closed captioning data;
identifies a text string beginning location of the audio/video stream, the identified text string beginning location corresponding to the beginning of the text string, wherein the video location corresponds to the identified text string beginning location; and
utilizes the at least one offset specified relative to the video location, and the identified text string beginning location, to identify boundaries of a segment of the show to be presented and boundaries of an interstitial within the audio/video stream; and
an audio/video interface communicatively coupled to the control logic that outputs the segment of the show for presentation by a display device, modifies a volume of audio data corresponding with the interstitial to obtain a modified volume segment of interstitial content, and outputs the modified volume segment of interstitial content for presentation by the display device.

10. The digital video recorder of claim 9, wherein the audio/video interface mutes the volume of the audio data corresponding with the interstitial.

11. The digital video recorder of claim 9, wherein the control logic is further operable to receive a signature of a portion of the audio/video stream associated with the identified location and process the audio/video stream to identify the boundaries based on the signature, the location information and the at least one offset specified relative to the video location.

12. The digital video recorder of claim 11, wherein the location information includes beginning and ending offsets, associated with the text string, that are specified relative to the video location, the beginning and ending offsets identifying beginning and ending locations of the segment of the show, and wherein the control logic is further operable to:
process the closed captioning data to identify an intermediate location within the audio/video stream corresponding with presentation of the text string;
process the audio/video stream to identify the video location based on the signature;
determine an adjustment offset between the intermediate location and the video location;
adjust the beginning and ending offsets based on the adjustment offset; and
identify the beginning location and the ending location of the at least one segment in the audio/video stream based on the adjusted beginning and ending offsets.

13. A digital video recorder comprising:
a communication interface that receives an audio/video stream including at least one segment of a show, at least one interstitial of the show and closed captioning data;
a storage medium;
control logic communicatively coupled to the communication interface and the storage medium that:
coordinates storage of the audio/video stream onto the storage medium;
receives location information for the audio/video stream, the location information including a text string associated with a video location within the audio/video stream, and the location information including at least one offset specified relative to the video location, wherein the location information is received separately from the audio/video stream;
processes the closed captioning data to locate an instance of the text string in the closed captioning data, and to locate a beginning of the instance of the text string in the closed captioning data;
identifies a text string beginning location of the audio/video stream, the identified text string beginning location corresponding to the beginning of the text string, wherein the video location corresponds to the identified text string beginning location; and
utilizes the at least one offset specified relative to the video location, and the identified text string beginning location, to identify boundaries of a segment of the show to be presented and boundaries of an interstitial within the audio/video stream; and
an audio/video interface communicatively coupled to the control logic that outputs the segment of the show at a first presentation rate for presentation by a display device and outputs the interstitial of the show at a second presentation rate for presentation by the display device.

14. The digital video recorder of claim 13, wherein the second presentation rate is greater than the first presentation rate.

15. The digital video recorder of claim 13, wherein the control logic is further operable to receive a signature of a portion of the audio/video stream associated with the identified location and process the audio/video stream to identify the boundaries based on the signature, the location information and the at least one offset specified relative to the video location.

16. The digital video recorder of claim 15, wherein the location information includes beginning and ending offsets, associated with the text string, that are specified relative to the video location, the beginning and ending offsets identifying beginning and ending locations of the segment of the show, and wherein the control logic is further operable to:

process the closed captioning data to identify an intermediate location within the audio/video stream corresponding with presentation of the text string;
process the audio/video stream to identify the video location based on the signature;
determine an adjustment offset between the intermediate location and the video location;
adjust the beginning and ending offsets based on the adjustment offset; and
identify the beginning location and the ending location of the at least one segment in the audio/video stream based on the adjusted beginning and ending offsets.

* * * * *

UNITED STATES PATENT AND TRADEMARK OFFICE
CERTIFICATE OF CORRECTION

PATENT NO. : 8,437,617 B2  
APPLICATION NO. : 12/486641  
DATED : May 7, 2013  
INVENTOR(S) : Steven Michael Casagrande Page 1 of 1

It is certified that error appears in the above-identified patent and that said Letters Patent is hereby corrected as shown below:

In the claims:

In Claim 13, Column 22, Line 44, replace the subscript "s" with a "," after the word – location Signed and Sealed this  
Tenth Day of September, 2013

Teresa Stanek Rea  
*Acting Director of the United States Patent and Trademark Office*